(12) United States Patent
Sillanpaa

(10) Patent No.: US 11,910,243 B2
(45) Date of Patent: Feb. 20, 2024

(54) METHODS AND APPARATUSES FOR NETWORK SLICE MINIMUM AND MAXIMUM RESOURCE QUOTAS

(71) Applicant: Nokia Solutions and Networks Oy, Espoo (FI)

(72) Inventor: Anna Sillanpaa, Jarvenpaa (FI)

(73) Assignee: Nokia Solutions and Networks OY, Espoo (FI)

( * ) Notice: Subject to any disclaimer, the term of this patent is extended or adjusted under 35 U.S.C. 154(b) by 403 days.

(21) Appl. No.: 17/290,316

(22) PCT Filed: Mar. 5, 2019

(86) PCT No.: PCT/EP2019/055396
§ 371 (c)(1),
(2) Date: Apr. 30, 2021

(87) PCT Pub. No.: WO2020/088802
PCT Pub. Date: May 7, 2020

(65) Prior Publication Data
US 2021/0377814 A1   Dec. 2, 2021

Related U.S. Application Data

(60) Provisional application No. 62/754,997, filed on Nov. 2, 2018.

(51) Int. Cl.
*H04W 28/26* (2009.01)
*H04W 72/04* (2023.01)

(52) U.S. Cl.
CPC .......... *H04W 28/26* (2013.01); *H04W 72/04* (2013.01)

(58) Field of Classification Search
CPC ...... H04W 28/26; H04W 72/04; H04W 76/10
See application file for complete search history.

(56) References Cited

U.S. PATENT DOCUMENTS

| 9,462,477 | B2 | 10/2016 | Ahmad et al. |
| 2011/0125905 | A1 | 5/2011 | Baucke et al. |

(Continued)

FOREIGN PATENT DOCUMENTS

| WO | 2017/171348 A2 | 10/2017 |
| WO | 2018/194971 A1 | 10/2018 |

OTHER PUBLICATIONS

Bulakci, "E2E Network Slicing: A RAN Perspective", 5G PPP WG Architecture Vice-chairman, METIS-II & 5G-MoNArch WP Leader, IEEE CSCN, Sep. 20, 2017, 14 pages.

(Continued)

*Primary Examiner* — Afshawn M Towfighi
(74) *Attorney, Agent, or Firm* — Barta Jones, PLLC

(57) ABSTRACT

Method, apparatuses, and computer program product for network slice minimum and maximum resource quotas with soft limits. One method may include sending by a user, a request for user connection to a network element, the request resulting in resource quota reservation in a specific network concept. The method may also include receiving from the network element, an indication of whether the request was successful or unsuccessful. The request may include at least one procedure or action indicating network resource availability. The method may further include receiving allocated resources according to resource allocation rules specific to whether the user is entitled to use the allocated resources, and whether a user connection, a session, a bearer, a signaling connection or a data radio bearer request was successful.

20 Claims, 12 Drawing Sheets

(56) References Cited

U.S. PATENT DOCUMENTS

| | | | |
|---|---|---|---|
| 2017/0086118 A1 | 3/2017 | Vrzic | |
| 2017/0141973 A1 | 5/2017 | Vrzic | |
| 2017/0303259 A1* | 10/2017 | Lee | H04W 28/16 |
| 2018/0316564 A1* | 11/2018 | Senarath | H04L 41/5051 |
| 2020/0128445 A1* | 4/2020 | Dong | H04L 47/78 |
| 2023/0156649 A1* | 5/2023 | Srivastava | H04W 60/00 455/435.1 |

OTHER PUBLICATIONS

Sallent et al., "On Radio Access Network Slicing from a Radio Resource Management Perspective", IEEE Wireless Communications, vol. 24, No. 5, Oct. 2017, pp. 166-174.

Mandelli et al., "Satisfying Network Slicing Constraints via 5G MAC Scheduling", IEEE Conference on Computer Communications, Apr. 29-May 2, 2019, pp. 2332-2340.

Akgul et al., "Service-aware Network Slice Trading in a Shared Multi-tenant Infrastructure", IEEE Global Communications Conference, Dec. 4-8, 2017, 7 pages.

"3rd Generation Partnership Project; Technical Specification Group Services and System Aspects; Management and orchestration; 5G Network Resource Model (NRM); Stage 2 and stage 3 (Release 15)", 3GPP TS 28.541, V15.1.0, Dec. 2018, pp. 1-232.

"Update Stage 3 NRM for RRM Policy enhancements", 3GPP TSG-SA5 Meeting #122, S5-187290, Nokia, Nov. 12-16, 2018, 26 pages.

"RRM Policy enhancements", 3GPP TSG-SA5 Meeting #122, S5-187426, Nokia, Nov. 12-16, 2018, 8 pages.

International Search Report and Written Opinion received for corresponding Patent Cooperation Treaty Application No. PCT/EP2019/055396, dated Jun. 11, 2019, 11 pages.

\* cited by examiner

METHODS AND APPARATUSES FOR NETWORK SLICE MINIMUM AND MAXIMUM RESOURCE QUOTAS

RELATED APPLICATION

This application claims priority to PCT Application No. PCT/EP2019/055396, filed on Mar. 5, 2019, which claims priority to U.S. Provisional Application No. 62/754,997, filed on Nov. 2, 2018, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to methods and apparatus for network slice minimum and maximum resource quotas with soft limits.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One embodiment may be directed to a method. The method may include sending by a user, a request for user connection to a network element, the request resulting in resource quota reservation in a specific network concept. The method may also include receiving from the network element, an indication of whether the request was successful or unsuccessful, the request comprising at least one procedure or action indicating network resource availability. The method may further include receiving allocated resources according to resource allocation rules specific to whether the user is entitled to use the allocated resources, and whether a user connection, a session, a bearer, a signaling connection and/or a data radio bearer request was successful.

In accordance with some example embodiments, an apparatus may include means for sending by a user, a request for user connection to a network element, the request resulting in resource quota reservation in a specific network concept. The apparatus may also include means for receiving from the network element, an indication of whether the request was successful or unsuccessful, the request comprising at least one procedure or action indicating network resource availability. The apparatus may further include means for receiving allocated resources according to resource allocation rules specific to whether the user is entitled to use the allocated resources, and whether a user connection, a session, a bearer, a signaling connection and/or a data radio bearer request was successful.

In accordance with some example embodiments, an apparatus may include at least one processor and at least one memory including computer program code. The at least one memory and the computer program code may be configured to, with the at least one processor, cause the apparatus at least to send by a user, a request for user connection to a network element, the request resulting in resource quota reservation in a specific network concept. The apparatus may also be caused to receive from the network element, an indication of whether the request was successful or unsuccessful, the request comprising at least one procedure or action indicating network resource availability. The apparatus may further be caused to receive allocated resources according to resource allocation rules specific to whether the user is entitled to use the allocated resources, and whether a user connection, a session, a bearer, a signaling connection and/or a data radio bearer request was successful.

In accordance with some example embodiments, a non-transitory computer readable medium may be encoded with instructions that may, when executed in hardware, perform a method. The method may send by a user, a request for user connection to a network element, the request resulting in resource quota reservation in a specific network concept. The method may also receive from the network element, an indication of whether the request was successful or unsuccessful, the request comprising at least one procedure or action indicating network resource availability. The method may further receive allocated resources according to resource allocation rules specific to whether the user is entitled to use the allocated resources, and whether a user connection, a session, a bearer, a signaling connection and/or a data radio bearer request was successful.

In accordance with some example embodiments, a computer product may perform a method. The method may send by a user, a request for user connection to a network element, the request resulting in resource quota reservation in a specific network concept. The method may also receive from the network element, an indication of whether the request was successful or unsuccessful, the request comprising at least one procedure or action indicating network resource availability. The method may further receive allocated resources according to resource allocation rules specific to whether the user is entitled to use the allocated resources, and whether a user connection, a session, a bearer, a signaling connection and/or a data radio bearer request was successful.

In accordance with some example embodiments, an apparatus may include circuitry configured to send by a user, a request for user connection to a network element, the request resulting in resource quota reservation in a specific network concept. The circuitry may also be configured to receive from the network element, an indication of whether the request was successful or unsuccessful, the request comprising at least one procedure or action indicating network resource availability. The circuitry may further be configured to receive allocated resources according to resource allocation rules specific to whether the user is entitled to use the allocated resources, and whether a user connection, a session, a bearer, a signaling connection and/or a data radio bearer request was successful.

In accordance with some example embodiments, a method may include receiving a request for user connection to a network element. The method may also include based on the request, setting a reservation of resource quota in a specific network concept. The method may further include sending an indication of whether the request was successful or unsuccessful, the request including at least one procedure or action indicating network resource availability. In addition, the method may include allocating resources according to resource allocation rules specific to whether a user is entitled to use the allocated resources, and whether a user connection, a session, a bearer, a signaling connection or a data radio bearer request was successful.

In accordance with some example embodiments, an apparatus may include means for receiving a request for user connection to a network element. The method may also include based on the request, setting a reservation of resource quota in a specific network concept. The apparatus may also include means for sending an indication of whether the request was successful or unsuccessful, the request including at least one procedure or action indicating network resource availability. In addition, the apparatus may include means for allocating resources according to resource allocation rules specific to whether a user is entitled to use the allocated resources, and whether a user connection, a session, a bearer, a signaling connection or a data radio bearer request was successful.

In accordance with some example embodiments, an apparatus may include at least one processor and at least one memory including computer program code. The at least one memory and the computer program code may be configured to, with the at least one processor, cause the apparatus at least to receive a request for user connection to a network element. The apparatus may also be caused to based on the request, set a reservation of resource quota in a specific network concept. The apparatus may further be caused to send an indication of whether the request was successful or unsuccessful, the request including at least one procedure or action indicating network resource availability. In addition, the apparatus may be caused to allocate resources according to resource allocation rules specific to whether a user is entitled to use the allocated resources, and whether a user connection, a session, a bearer, a signaling connection or a data radio bearer request was successful.

In accordance with some example embodiments, a non-transitory computer readable medium can be encoded with instructions that may, when executed in hardware, perform a method. The method may receive a request for user connection to a network element. The method may also, based on the request, set a reservation of resource quota in a specific network concept. The method may further send an indication of whether the request was successful or unsuccessful, the request including at least one procedure or action indicating network resource availability. In addition, the method may allocate resources according to resource allocation rules specific to whether a user is entitled to use the allocated resources, and whether a user connection, a session, a bearer, a signaling connection or a data radio bearer request was successful.

In accordance with some embodiments, a computer program product may perform a method. The method may receive a request for user connection to a network element. The method may also, based on the request, set a reservation of resource quota in a specific network concept. The method may further send an indication of whether the request was successful or unsuccessful, the request including at least one procedure or action indicating network resource availability. In addition, the method may allocate resources according to resource allocation rules specific to whether a user is entitled to use the allocated resources, and whether a user connection, a session, a bearer, a signaling connection or a data radio bearer request was successful.

In accordance with some embodiments, an apparatus may include circuitry configured to receive a request for user connection to a network element. The apparatus may also include circuitry configured to, based on the request, set a reservation of resource quota in a specific network concept. The apparatus may further include circuitry configured to send an indication of whether the request was successful or unsuccessful, the request including at least one procedure or action indicating network resource availability. In addition, the apparatus may include circuitry configured to allocate resources according to resource allocation rules specific to whether a user is entitled to use the allocated resources, and whether a user connection, a session, a bearer, a signaling connection or a data radio bearer request was successful.

BRIEF DESCRIPTION OF THE DRAWINGS

For proper understanding of example embodiments, reference should be made to the accompanying drawings, wherein.

DETAILED DESCRIPTION

Figure 1:
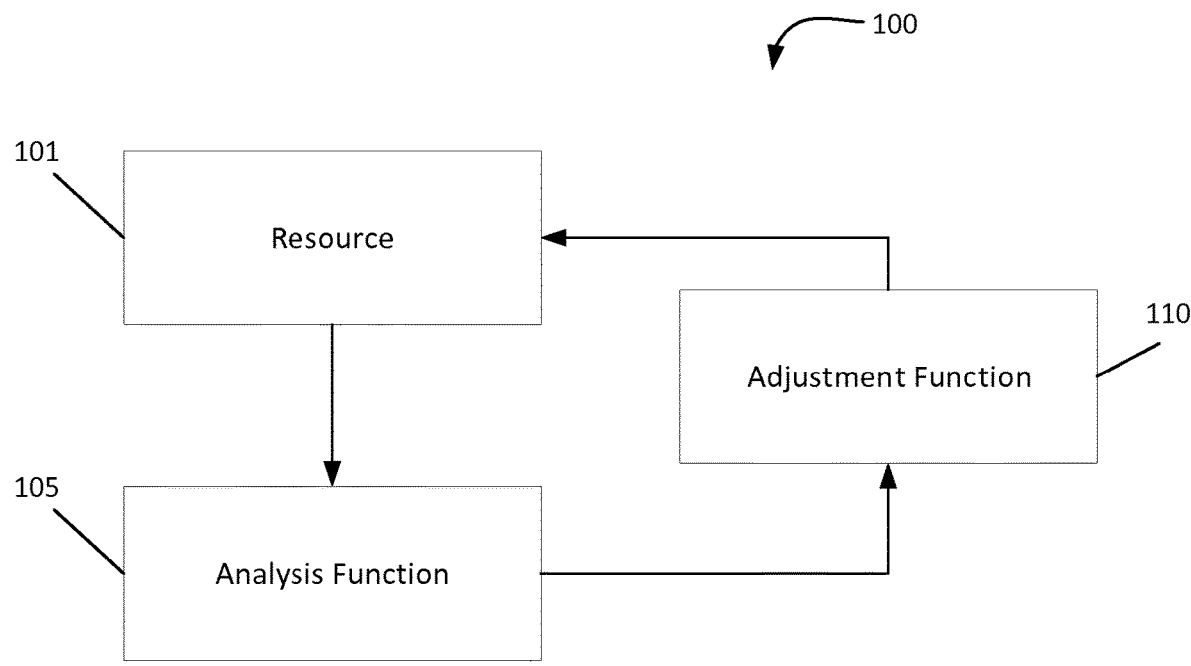
FIG. 1 illustrates a flow operation, according to an example embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for efficient inactive idle state transition, for example in 5G, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

As mentioned above, in 5G, the nodes that can provide radio access functionality to a user equipment (i.e., similar to Node B in UTRAN or eNB in LTE) are named gNB when built on NR radio and named NG-eNB when built on E-UTRAN radio. In the following, both types of nodes are implicitly considered when reference is made to a next generation radio access network node (NG-RAN node).

In certain communication systems for mobile networks such as 5G, mobile devices may communicate over an air interface with the mobile network infrastructure to provide communication means for users. For instance, mobile users may move in and out of a particular cell or network, move around within one or multiple cells, frequencies, radio technologies and networks. Some or all of the networks may be fixed (non-mobile), and communication between user devices and the communication infrastructure can also be via a fixed link such as a line cable. Further, the network users may be entitled and/or willing to use different applications and services. This may be due to subscription, device capability, current congestion level(s) in the system, etc. In addition, this may result in different radio and other resource allocations for the user equipments (UEs).

Network slicing may be a concept, function, or structure that is intended to enable operators to manage their system resources, and also to be able to provide services to external tenants to generate additional revenue. Network slicing may also provide the ability to run multiple logical networks or network partitions over a common physical infrastructure in an efficient and economical way. In addition, a network slice or a network concept can be an independent logical network that runs on a shared physical infrastructure. Alternatively, a network slice may span across multiple parts of the network and be deployed across multiple operators. When operators are selling services to external tenants, there may be a need to convert the contractual obligations (e.g., service level agreements (SLAs)) to network requirements.

Without proper resource use, it may be necessary to reserve and keep a considerable amount of free resources ready to serve specific users, which may include users belonging to a specific network slice(s). This may ultimately waste expensive resources, or prevent the operator from serving specific users if all of the resources are already reserved when the specific users request resources.

Other issues may reside with only maximum or only minimum quota for network slices. For instance, with a maximum only quota, if the maximum provides the upper limit, then if shared resources are used, there would be no guarantee that network slices will get any minimum. Additionally, with a minimum only quota, if the minimum gives the guaranteed limit, then the slices may be entitled for this amount but not more. It may be possible that the minimum limit may be exceeded, however, this may not be guaranteed. Moreover, SLA may not be met and free resources may be allocated in an arbitrary manner among slices. For instance, the resources may be allocated based on user or user's bearer based quality of service (QoS) and/or on a first come, first served basis, and this alone may not provide the best outcome from the operator's point of view.

There may also be problems with maximum quotas that can temporarily exceed a given limit in network slicing. For instance, network slices may temporarily borrow each others' resource quotas. That is, resources may be split to various network slices, and if one network slice quota is used entirely and a new request comes, resources are borrowed for to serve the request. At congestion times, all quotas may easily be completely used, and other network slice users may be using the specific network slice quota and the network slice users cannot obtain resources they are entitled to, or only network slice, QoS and/or allocation and retention priority (ARP) based pre-emption can be used. However, these methods are not always efficient and not good from an end-to-end (E2E) user and operator key performance indicator (KPI) point of view, as pre-emption means terminating the user bearer and that may typically result in application session termination (e.g., a call may be terminated in the middle of a conversation). For network slice quotas, if each network slice has a strict reserved quota that others cannot use, it may be likely that resources may be significantly underused as traffic using the slices vary. On the other hand, if other network slices are allowed to use each others' quota, then the specific network slice may not obtain resources when needed, and SLAs may not be met, and wrong network slice users may end up receiving the resources.

Another problem may be that there is a specific non-reserved quota that may be used for different network slices if the network slice specific minimum (or other) quota is not sufficient. Here, it may be possible that a room may not be enough during congestion times for the most important slices and their users. If not, network slices may need to be prioritized if they have different priorities for resource use than what their QoS parameters indicate. Prioritization of network slices can be used in some cases. For example, prioritization can also be combined with network slice quota(s), soft limit(s) and/or margin(s), so that prioritization is done additionally within the slice quota. At the same time, in large systems using only prioritization with many network slices, this may be complex as there may be many network slices and this order may need to be configured and maintained in many parts of the network when slices are added, modified, and removed. Thus, when resources are used up and a higher priority user comes, the lower priority user may need to be moved elsewhere (may not be possible) and the lower priority user's service may ultimately be terminated or higher priority user will not be served.

As an illustrative example, if there is 10% free quota that can be temporarily used if the network slice specific quota is full, two possibilities may arise. A first possibility may be that if there is a strict limit of 2% that each network slice can use so that the sum of these do not exceed the total "temporary quota," then the quota may always be sufficient. However, resources may be underused most of the time, and resources may be wasted.

A second possibility may be that each network slice may be allowed to use a temporary quota more than 2%, such as, for example, 3%, so that the total sum of the temporary exceeds may be more than the total "temporary quota." This results in a situation where some network slice gets 3%, but other network slices may only get 1%, which would not be fair. There may also be a risk that some of the resources may be idle even if some slice would need them as there is the strict upper limit. On the other hand, if the upper limit is exceeded, then it may be more unfair for other network slices.

In certain cases, QoS characteristics may be set and supervised. However, these are on a per user, per user session, or sub-session bases. At times, use of any quotas may not be desired. Instead, resources may either be shared or dedicated to specific users. Thus, resources may either be shared to all users based on QoS parameters, or some resources may only be used for specific users such as, for example, with multi-operator radio access network (MO-RAN), some radio frequencies may only be allowed to specific public land mobile network (PLMN) users. Additionally, in situations where maximum limits for resources during congestion times in multi-operator core network (MOON)/wideband code division multiple access (WCDMA) inter circle roaming, cell use may be divided between different PLMN IDs. In addition, maximum limits may be specified in current third generation partnership project (3GPP) Rel-15 SON.

Certain example embodiments may define minimum limitations such as, for example, for congestion times, and soft limitations for maximum and minimum resource quotas which may be needed to ensure that there are resources available for network slice specific users when needed. With a soft limit, network slice specific unused resources may be allocated to other users in order not to keep them idle and unused. However, for network slice specific resources, a margin may be used so that a certain amount of the resources may be kept free so that there may always be resources available when needed. The margin may be operator configurable and different for different slices, services, and resources as well as different for minimum and maximum quotas.

In an example embodiment, a reserve quota may be, but not limited to, 3%. Moreover, the reserve quota may be configurable, pre-determined, or it may be changed based on estimated needs such as, for example, during rush hour and non-rush hour time periods. In addition, according to other example embodiments, admission control, load control, and traffic steering may be used to steer users to other resources based on pre-configuration (e.g., when only margin quota is left or own users start to use margin quota the actions are started to move users to other resources such as other cells). This action may be stepwise such as, for example, first starting with those network slices which are borrowing quota and after that also own slice users if and as possible, when users from other network slices are using "borrowed" quota. For example, if one cell is full, then a user may be handed over or redirected to another cell. In certain example embodiments, there may be no new requests that are accepted from other network slice users (the ones borrowing resources) when the margin or other configuration is met, but only own slice users (i.e., only from those users who belong to the slice). In addition, QoS, ARP and other aspects may be combined with the steering policy. For example, in an example embodiment, guaranteed bit rate and non-guaranteed bit rate bearers and service flows may be treated differently, as well as different allocation and retention priority attributes such as priority level.

According to an example embodiment, unrelated network slices may be grouped together to minimize the need for slice specific differentiated processing, configurations and counters. In order to ensure that adequate service may be provided to the group, the grouped "unrelated" slices may need to have similar SLA requirements. In addition, according to other example embodiments, a common resource manager may be provided for several resources to balance the need for more than one resource, and to provide artificial intelligence (AI) and learning and traffic steering possibilities for network slice resource use.

In certain example embodiments, a specific network slice may refer to one network slice or a group of networks slices. In addition, various combinations of network slices may be possible. For instance, network slices intended for different users, user groups, organizations and/or services may be grouped together to achieve simplified resource use management. In other example embodiments, resource max and/or min may be changed dynamically. In addition, the new value may be taken into account immediately, with delay or at system/element/resource restart, for example, to accommodate different traffic volumes and prioritization during congestion times and nighttime, and based on resources already used in certain time periods.

FIG. 1 illustrates a flow operation according to an example embodiment. As illustrated in FIG. 1, an operation flow may include a resource 101, analysis function 105, and adjustment function 110. At the resource 101, a resource in question may include a cloud virtual machine (VM) based service data adaptation protocol (SDAP) and/or packet data convergence protocol supporting users in u-plane traffic for the network slice/network slice group. In addition, the resource may include one or more sub-resources responsible for the same or different functionality. Further, in an example embodiment, FIG. 1 may represent high-level functions, and margin analysis and/or adjustment and/or traffic steering are sub-functionalities within this high-level functionality, and they may reside inside and/or outside a resource or set of resources.

Further, resources used per measurement target, for example, specific network slice total or partial consumption for 5QI or bit rate per second, may be sent to the analysis function 105. The analysis function may have information on the minimum and maximum quotas, quota types such as whether soft limit(s) may be used with or without margin, how much of the margin is used and/or is left, how much is used by own slice users, how much is borrowed, details on user and user bearer characteristics such as 5QI, QoS, ARP, application related information (e.g., eMBB, URLLC), different type(s) of IoT (Internet of Things), emergency services, location services, warning systems, commercial broadcast service (e.g., CMAS), and others. The analysis function 105 may measure giving input to adjustment for network slice traffic adjustments, including, for example, policing and prioritizing/deprioritizing specific network slice (group) traffic. In an example embodiment, this may reside within the resource, outside the resource, or partially inside the resource.

From the analysis function 105, analysis such as whether specific quota is exceeded, met, or not met may be sent to the adjustment function 110. Here, adjustment comments for network slice traffic adjustments may be provided. Example adjustment commands may include policing and prioritizing/deprioritizing specific network slice (group) traffic. In an example embodiment, the adjustment function may reside within the resource or outside the resource. Alternatively, the adjustment function may reside partially inside the resource. From the adjustment function 110, adjustment commands or instructions such as deprioritizing specific network slice 5QI may be sent to the resource 101.

Figure 2:
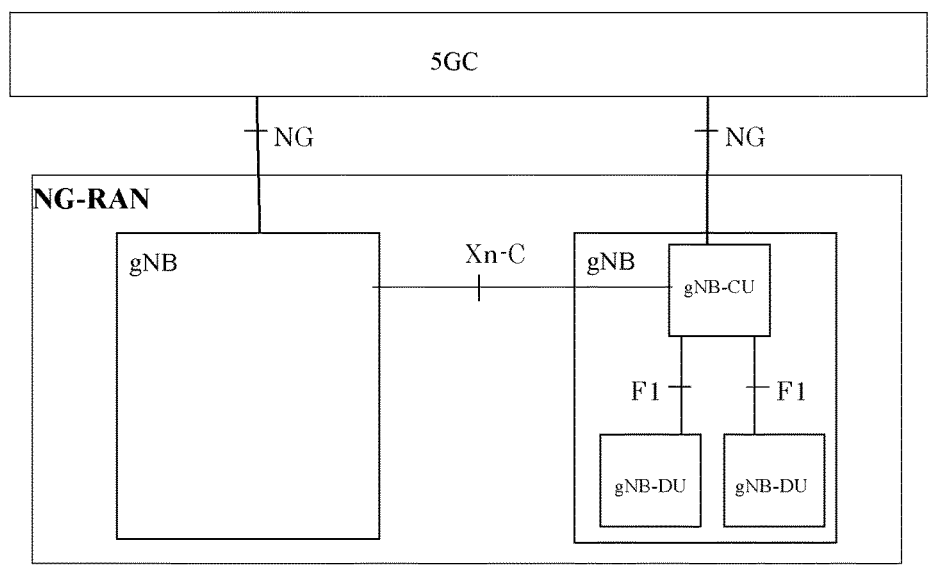
FIG. 2 illustrates a system architecture for network slice or network slice group resource quota delivery, according to an example embodiment.

FIG. 2 illustrates a system architecture for network slice or network slice group resource quota delivery according to an example embodiment. In particular, FIG. 2 illustrates a basic 5G RAN system architecture and its interfaces. According to FIG. 2, all or some of the 5G RAN interfaces may provide network slicing resource quota information. In an example embodiment, information sent over various interfaces may be the same, different or partially the same or different.

Although certain interfaces are illustrated in FIG. 2, according to other example embodiments, additional interfaces may also be included. For instance, certain example embodiments of the system architecture may include an E1 interface between the Gnb CU U- and C-plane. Moreover, an Xn/X2 interface may be included and used for dual connectivity and standalone architecture or combinations of these between 5G and LTE/eLTE RANs or within 5G, LTE and evolved LTE RANs. The system architecture may further include an Xn/X2 interface used between the 5G-LTE RANs (5G gNBs and eNBs), LTE-eLTE RANS (eNBs and ng-eNBs), and/or 5G-eLTE RANs (gNBs and ng-eNBs). In other example embodiments, elements including carrier aggregation, connected small cells, mobile edge computing (MEC), and local breakout may also be included. In further example embodiments, the network slice quota may be provided with 3GPP SON solutions either directly to each related element, or conveyed over the 3GPP Rel-15 interfaces, or via other interfaces such as operation and maintenance (O&M)/operability interfaces as well as various configuration interfaces, and batches.

Certain example embodiments may create means to set requirements to a network system and parts of it to meet certain network requirements. For instance, the network requirements may be met in a dynamic and/or static manner. Further, an operator of the network may have the ability to define certain resource use rules for network slices and groups of network slices. For example, minimum and maximum quotas may be defined to supervise the quota use and adjust it as needed to meet certain SLAs or other requirements.

According to certain example embodiments, a network slice (or group of network slices) may have a soft limit maximum quota. For instance, there may be a maximum quota for the network slice. However, when users of the network slice do not need the all of the quota resources, other users may use the unused quota resources. In an example embodiment, the maximum quota may be 20 users per cell. However, this may be a soft limitation because if there are not 20 users for the network slice (slice_1), other network slice users may use the free (unused) quota.

According to other certain example embodiments, traffic steering may be provided when the quota ends. For instance, when the quota ends, network slice_2/3 users may be moved elsewhere first, but as a last resort, the service for network slice_2/3 users may be terminated in order to serve network slice_1 users. Alternatively, network slice_1 users may be moved elsewhere if moving network slice_2/3 users cannot be successfully moved elsewhere.

In certain example embodiments, a typical quota may be a percentage and physical resource blocks/transmission time intervals (PRBs/TTIs) or other radio interface resource elements. According to an example embodiment, the percentage may be interpreted or converted to exact figures. For example, if the percentage is 10%, it may be 10 or 20 users, DRBs, RRC connections, etc. However, it may also represent an amount of bit rates including, for example, 100 kbp/s or 1 Mbp/s. In addition, there may be different figures for a guaranteed bit rate (GBR) and non-GBR, different 5QIs (or QCIs, or other quality of service attributes), different type of slices such as eMBB, URLLC, critical communication services, massive IoT, CMAS, earthquake and tsunami warning systems (ETWS), and their respective sub-types (e.g., different types of URLLC services).

Different traffic steering possibilities may also exist in certain example embodiments. For example, different steering possibilities may include handovers, redirects, moving user to RRC idle or RRC inactive mode from RRC connected mode more quickly, moving user from RRC inactive mode to RRC idle mode, reduce bit rate (GBR, nominal bit rate, non-GBR bit rate, etc.) and handover to other resources. According to certain example embodiments, the other resources may include other user and/or control plane logical and/or physical resources within the network elements or between them such as bit rates, number of virtual network functions, control and/or user plane logical processes, processors, and memory. In certain embodiments, the actions may be used to reduce resource consumptions on some resources. Reverse actions to move UEs back to these or other available resources may also be done, for example, when margin is available own slice users can be moved back to such resources (e.g. cells or scheduling TTIs/PRBs can be increased, bit rates can be increased, etc.). In addition, when soft limit quota is available for own slice users or other slice users, those can be moved to these resources (cells, frequencies, RATs, U-plane resources, etc.), and these resources can be increased. In other words, when there is a congestion situation or time is over, "reverse" actions can be taken. These traffic steering actions can also be used to deactivate some resources, for example, to save electricity by shutting down some cells or frequencies or other resources during nighttime. Once such time or situation is over, reverse actions can again be taken.

In certain example embodiments, the soft limit maximum quota may be without a safety margin. That is, a limit quota may not be used or set to "0." For example, if there are 10 network slice_1 users, 10 users from other network slices such as, for example, network slice_2 and network slice_3, may be allowed to use the free quota. Then, if an 11$^{th}$ network slice_1 user comes to the cell, one of the network slices_2/3 users may be handed over to another cell or radio access technology (RAT) (with handover or redirect), and the new network slice_1 user may be admitted to the cell. As a last resort, the network slice_2/3 user's service may be terminated to accommodate the new network slice_1 user. In addition, according to certain example embodiments, the traffic steering described above with regard to when the quota ends may also be applicable with soft limit maximum quota without a safety margin.

In another example embodiment, the soft limit maximum quota may include a safety margin, such as, for example, a safety margin of 4. In other example embodiments, a safety margin may be more or less than 4. According to an example embodiment, if there are 10 network slice_1 users, 6 users from other network slices (e.g., from network slice_2 and network slice_3) may be allowed to use the free quota up to a safety margin of 4. This would mean that the safety is kept free for network slice_1 users. More specifically, as 10+4+6=20, only network slice_1 users may be admitted. When more of those arrive and request resources, network slice_2/3 users may be allowed to stay, but no more such users may be accepted for the resource, or they would be handed over to other cells immediately when an 11$^{th}$ network slice_1 user accesses the cell, or when for example, 2 or 4 network slice_1 users are allowed into the cell. In addition, according to certain example embodiments, the traffic steering described above with regard to when the quota ends may also be applicable with soft limit maximum quota including a safety margin.

According to an example embodiment, a maximum quota may be used at resource reservation, and may also be used dynamically while supervising the resource use (consumption). Further, the soft quota and safety margin may also be added on top of the network slice quota so that if the quota is 10, for example, then a 2% may be allowed on top of the 10% quota. In another example embodiment, a generic common resource pool of quota(s) may be provided to offer services to all or some slices when their specific resource quotas are already used or they do not have their own quotas. This may allow the operator to have a common reserve pool to which various network slice users may be moved if their network slice specific quota is full, or they are using soft quota from other network slices but need to be moved elsewhere. In other example embodiments, the minimum quota may be similarly used as the maximum quota at resource reservation and while supervising the resource use (consumption) at congestion times.

In certain example embodiments, minimum quota may be used differently for different resources. For example, if it is used for a number of RRC connections or DRBs, if there are only 3 requests for such services, then the remaining resources up to the margin may be given to other users. However, in case of bit rate, slice specific users throughput may be increased up to the minimum quota, either with hard reservation or as long as they have data to send. In addition, according to certain example embodiments, the traffic steering described above with regard to when the quota ends may also be applicable when maximum quota is used at resource reservation and dynamically while supervising the resource use. Further, in an example embodiment, the traffic steering may be pre-configured when it is started, for example, when the network slices start to use the excess (common quota), or when excess quota reaches certain reservation points. There may also be different starting points for traffic steering actions and sub-quotas/quotas as described above.

In certain example embodiments, resources in question may be new data radio bearers (DRBs), radio access bearers (E-RABs) etc. for users, new user plane VM resources, and new user radio resource control (RRC) connections. According to an example embodiment, used resources may be counted per number, for example, number of users in a cell, or by a required or estimated bit rate. In other example embodiments, resource allocation may be done by giving a percentage number, such as, for example, 10% per specific entity. In certain example embodiments, the specific entity may include a system such as a network system, gNB, central unit (CU), or a distributed unit (DU)-user plane. According to another example embodiment, the resource allocation may be done by giving a strict number such as 50 RRC connections.

According to certain example embodiments, resource allocation may also be done by giving a number that is different per different resource, functions, entity, etc. For example, a hierarchically higher level entity in the system may support more of the lower level entities and, thus, the percentage shares may need to be different. For instance, there may be many DUs connected to one CU. Thus, the CU resource allocation quota percentage share may be 30% and the DU share may be 5%. In other example embodiments, certain elements may be more critical, and a different amount of resource quota may be allocated to ensure resource availability at different times or all times for specific types of users, and QoS applications.

In an example embodiment, the quota may change to accommodate the user needs or operator policies depending on the time of day, month, or year. For example, certain network slices may require more resources at certain times and, thus, quota may be increased for such times. Alternatively, the operator may wish to provide free capacity for users during night time to encourage people to use resources during low congestion periods.

According to certain example embodiments, the resource allocation may be of different types even if the percentage number or limit is used for the network slice resource quota. For example, if the percentage number may be 10% for resource allocation purposes, it may be converted to a different restriction/limit in the system implementation. Further, in an example embodiment, whether the resource is allocated (100%) or not (0%), and yes typically means exactly one set of resources is allocated or not to support specific functionality including, for example, DRB and RRC connections. Thus, according to certain example embodiments, certain resource allocations may be more flexible, and the amount of resources allocated may vary dynamically or semi-dynamically and be adjusted based on user need and/or system load (e.g., PRBs, transmission time intervals (TTIs) in scheduling).

In certain example embodiments, a resource pool model may be provided. The resource pool model used may be shared between different network slices, exclusive to one or more network slices, shared between different network slices with soft limit quotas with minimum and maximum values, or a mixture of the above. Moreover, in an example embodiment, a network slice quota may be for network slices related to each other, such as belonging to the same organization (e.g., common slice differentiators (SDs), operators, own subscribers, etc.), or being used for the same purpose (e.g., eMBB or internet traffic, or for voice services, or for URLLC, or for critical communications, for IoT, or specific IoT services and devices). In other example embodiments, network slices for quota handling purposes for network slices that are not otherwise related may be grouped together. This may be done to use the same resource quota(s) and, thus, related resources and related statistics, parameters for supported QoS, services, and functionality.

In further example embodiments, the groupings may be done based on PLMN ID(s), for example, with network and/or RAN sharing, whereas in other example embodiments, the groupings may be done based on per UE type, IoT/NB-IoT, MTC, URLLC, and others, as well as specific use such as types of subsystems and access types. For example, certain network elements and/or resources may be allocated for specific use such as satellite. In such a case, the quotas may be used to control satellite system based resource use. In addition, in further embodiments, the groupings may be done based on a combination of different groupings and/or nesting of different groupings. For example, PLMN ID(s) may be used for higher level quotas and/or margins, and slice level quota groupings may be used under those. In another example embodiment, the network may include a set of different groupings for quotas; for example, 30% of the resources are grouped based on PLMN IDs, 40% based on slices and 30% may be general quota used by all users.

In another example embodiment, the network may include a set of different groupings for quotas. For example, 70% of the CU resources may be grouped based on PLMN IDs, and under the 70%, 60% based on slices, 30% may be used for satellite access and its users, and 10% general quota may be used by all users. The DU use may be different as fully or partially dedicated DU(s) may be used for URLLC, satellite, etc. For simplicity, slice may be used herein, even if the same solution may be used with PLMN ID(s), UE type, etc.

According to certain example embodiments, slice quotas may be combined or "nested." Specifically, in certain example embodiments, slice quotas may be completely or partially overlapping and prioritized. For example, there may be a maximum soft quota of 100% or 80% for certain resources for GBR traffic with a margin of 3%, and this may have the highest priority. In addition, there may be another quota for non-GBR traffic services fro 3 sets of slices, each with 20% maximum quota, with a lower priority. In certain example embodiments, these slices may be for different services or organizations than the GBR slices. Thus, resources may first be given for the GBR with the highest priority as long as there are such users. Further, the unused soft quota resources may be given for the lower priority services as long as they do not exceed their own maximum quota. Then, when the high priority slice GBR users increase and there is only margin left from that GBR quota, lower priority slice requests are not accepted anymore and traffic steering may start in which lower priority users are moved to other resources as possible. In addition, according to other example embodiments, it may be possible to have different reserve quota margins and starting points for traffic steering to different resources. For example, the reserve margin and traffic steering and policing may be decoupled so that the traffic steering starts before the margin quota use is started. Although the above example embodiments relate to resources for GBR traffic, other example embodiments may not be so limited to this type of resource since other resources may also be applicable in the manner described above with respect to GBR traffic.

Figure 3:
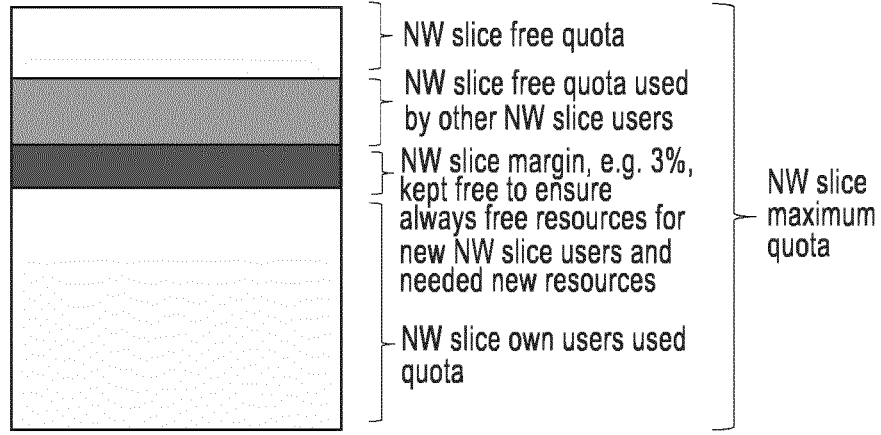
FIG. 3 illustrates a sample network slice with a maximum quota, according to an example embodiment.

FIG. 3 illustrates a sample network slice with a maximum quota according to an example embodiment. As illustrated in FIG. 3, with soft limits on maximum quotas, it may be possible to ensure that specific resource quota may be reserved for network slice users. In addition, reserved quota may be used by other users when users of a network slice do not use the free quota, and the safety margin may ensure that the network slice users can be served at all times when there is a new request.

Figure 4:
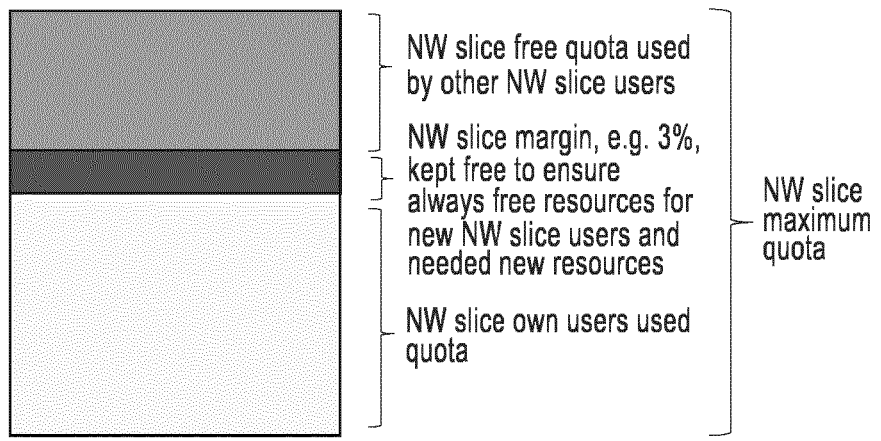
FIG. 4 illustrates a sample network slice with a maximum quota utilizing traffic steering, according to an example embodiment.

FIG. 4 illustrates a sample network slice with a maximum quota utilizing traffic steering according to an example embodiment. As illustrated in FIG. 4, once a free quota is used up, a safety margin may still be available for own users of a network slice. In addition, new other slice users may be moved (handed over or redirected) to other resources. When the free margin decreases, existing other slice users may be handed over to other resources to keep the safety margin at 3% (or other configurable values). In addition, according to certain example embodiments, the traffic steering described above with regard to when the quota ends may also be applicable here with a sample network slice with a maximum quota utilizing traffic steering.

According to certain example embodiments, network slice specific traffic steering may be provided. In addition, other aspects may be used in addition to network slice such as user or device type (fast/slow moving, non-moving, mobile initiated connection only users, etc.), RAT preferences, service type (voice/non-voice, URLLC, critical communications, CMAS, ETWS), 5QI (QCI), ARP, other QoS aspects, etc. For instance, in certain example embodiments, traffic steering may be performed differently based on various factors including, for example: (1) network slices and network slice instances and parts/subset of them (e.g., single network slice selection assistance information (S-NSSAI), SD, or SST); (2) different geographical radio network areas (e.g., TAs or groups of TAs); (3) cells, frequencies, or bands; (4) services used, voice, video, internet traffic/eMBB, or URLLC; (5) radio network functionality, dual connectivity, carrier aggregation, or radio access network type (LTE, 5G, etc.); (6) organizations, different organizations "owning" network slice (e.g., SD part of slice), or public safety; (7) different user or device type, non-moving, fast moving, or slowly moving; (8) operator defined policies for different network slices; (9) different procedures such as redirection or handover to other resource, cell, frequency, or RAT.

Figure 5:
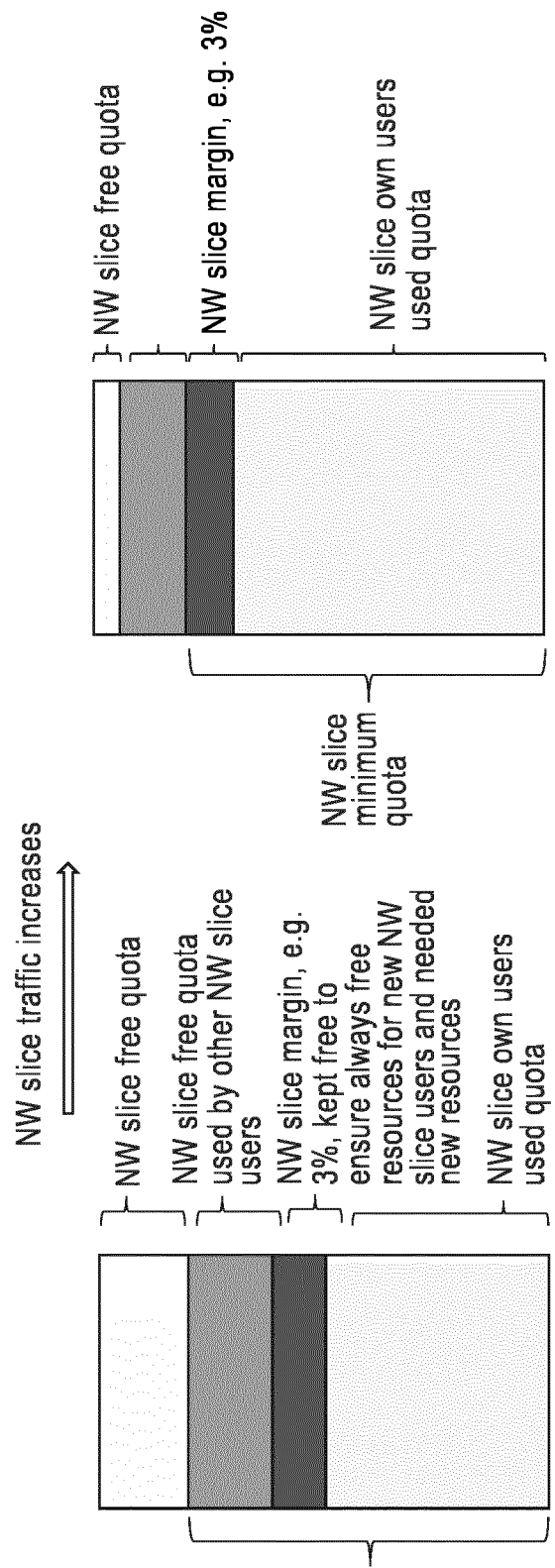
FIG. 5 illustrates a network slice minimum quota with a soft limitation and margin, according to an example embodiment.

FIG. 5 illustrates a network slice minimum quota with a soft limitation and margin according to an example embodiment. As illustrated in FIG. 5, a network slice minimum quota restriction may not be activated as own slice users do not need the minimum quota. However, as network slice traffic increases, the network slice minimum quota restriction may be activated as own slice users of a network slice need the minimum quota resources. In such a case, other network slice users may still use the free quota above the minimum quota. In addition, according to certain example embodiments, the traffic steering described above with regard to when the quota ends may also be applicable with a network slice minimum quota with a soft limitation and margin. Thus, according to certain embodiments, there may be traffic steering so that if other users are using minimum quota if own slice users are not using it, traffic steering may start when the margin quota (resource reservation) starts to be used. It may also be possible to have minimum quota without soft limit with traffic steering, for example, when minimum quota is used traffic steering may start if there is no maximum quota.

Figure 6A:
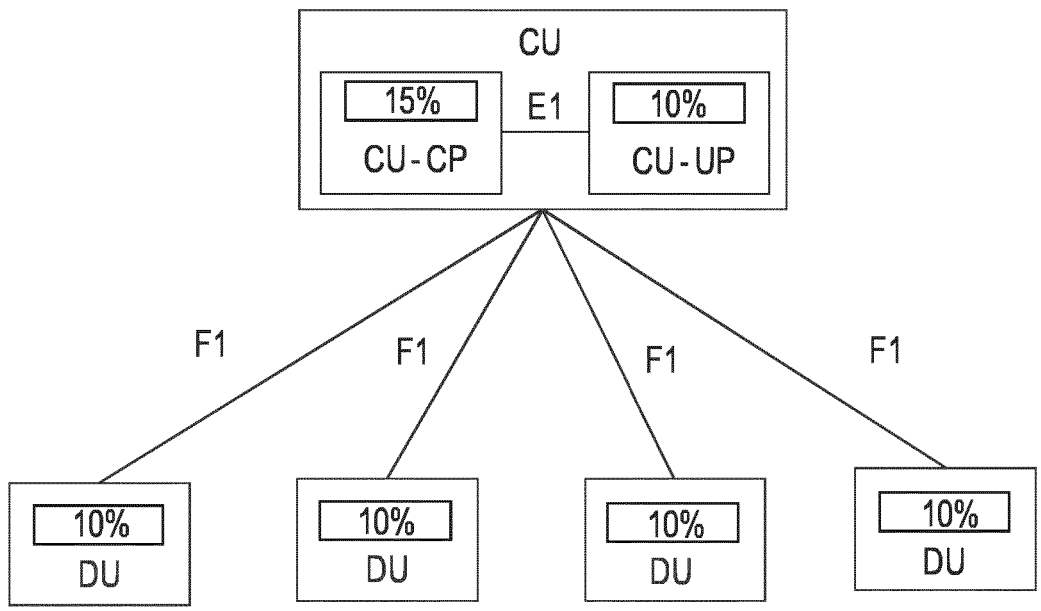
FIG. 6(A) illustrates a maximum and minimum quota with a soft limit with and without a safety margin for a small area use case, according to an example embodiment.

FIG. 6(A) illustrates a maximum and minimum quota with a soft limit with and without a safety margin for a small area use case according to an example embodiment. As illustrated in FIG. 6(A), different resource quotas may be allocated for the network slice. In an example embodiment, the different resource quotas may be allocated for the network slice depending on the resource. In another example embodiment, the allocated quota may depend on the network slice(s), the resource, the strictness of the network slice SLA, and the applications for which the network slices are used. Further, the examples illustrated in FIG. 6(A) may be useful for cases when certain services are supported throughout the network with a specific 10% air interface quota of 10% reserved for the network slice. In such a case, it may be expected that 10% of CU-UP and 15% of CU-CP resources are sufficient for the slice as these are centralized elements with more capacity. Thus, 10% of these elements may correspond to more than 10% of DU resources. According to an example embodiment, each resource may be allocated as needed based on service needs, operator policies, network slice priorities, and SLAs. In addition, according to certain example embodiments, the traffic steering described above with regard to when the quota ends may also be applicable with a maximum and minimum quota with a soft limit with and without a safety margin for the small area use case.

Figure 6B:
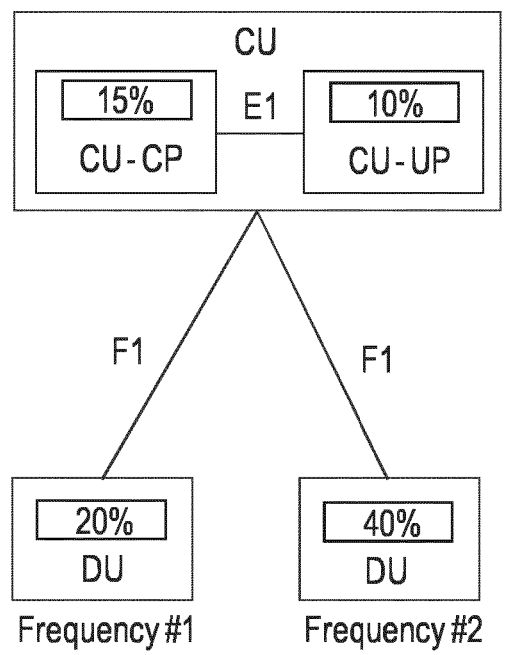
FIG. 6(B) illustrates a maximum and minimum quota with a soft limit with and without a safety margin for another small area use case, according to an example embodiment.

FIG. 6(B) illustrates a maximum and minimum quota with a soft limit with and without a safety margin for another small area use case according to an example embodiment. As with FIG. 6(A), FIG. 6(B) illustrates different resource quotas may be allocated for the network slice. In an example embodiment, the different resource quotas may be allocated for the network slice depending on the resource. In another example embodiment, the allocated quota may depend on the network slice(s), the resource, the strictness of the network slice SLA, and the applications for which the network slices are used. Further, FIG. 6(B) illustrates a use case for cases when certain cells support a specific use case (e.g., company) in a small area where the use case requires more resources in the specific area and less in the surrounding area. In addition, according to certain example embodiments, the traffic steering described above with regard to when the quota ends may also be applicable with a maximum and minimum quota with a soft limit with and without a safety margin for the another small area use case.

Figure 7:
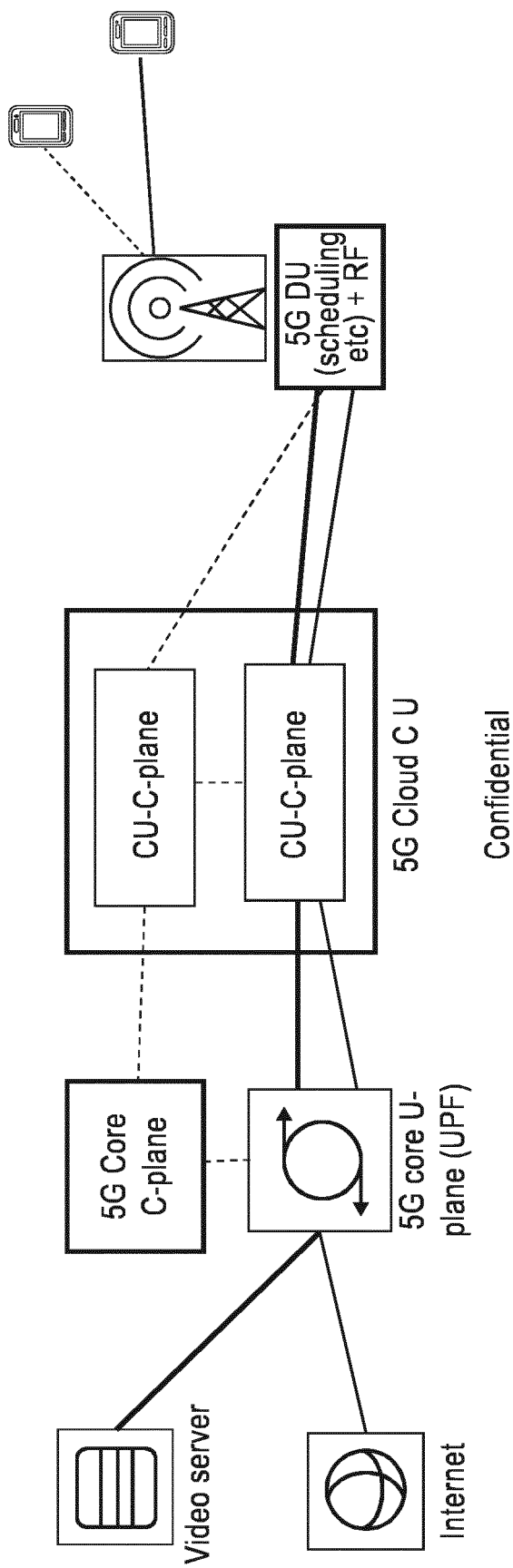
FIG. 7 illustrates a block diagram of quota supervision in a radio access network central unit control plane, according to an example embodiment.

FIG. 7 illustrates a block diagram of quota supervision in a radio access network central unit control plane, according to an example embodiment. According to certain example embodiments, virtual resource pools may be used in a central unit-central plane (CU-CP), central unit-user plane (CU-UP), and a distribution unit (DU). In an example embodiment, the CU-CP may supervise the slice specific minimum and/or maximum quota use, and associated margin quotas if used in certain ways. For example, the CU-CP may perform supervision when admitting a new user to the system at power on, with moving from RRC idle to RRC active, with location update, and at incoming handover. The supervision may also be performed when admitting a new bearer at bearer setup, at bearer modification (with QoS update such as increasing bit rate), and with incoming handover. In each of these cases, the used quota for the slice may be updated accordingly, for example, by increasing the number of admitted users (RRC connections), bearers (PDU session and/or DRB), and/or bit rate (e.g., minimum and/or maximum). In addition, the supervision may be performed when the UE moves to RRC idle, or when the DRB is released. Here, the used quota may be decreased accordingly.

An example of per bearer bit rate used for maximum bit rate is session aggregate maximum bit rate (AMBR) used for all non-GBR (guaranteed bit rate) of all DRBs of the PDU session. In certain example embodiments, there may be one or more DRBs sharing the session AMBR. Thus, it may be split by them or the session AMBR may be used for all of them. An example of bit rate used for minimum bit rate for non-GBR DRB is nominal bit rate indicting a lower limit that the system/subsystem (e.g. RAN) tries to provide for the DRB. The nominal bit rate may be the same or different for different DRBs. For GBR DRB, the bit rate used for minimum and maximum can be the GBR bit rate or the minimum and the maximum may be separately determined.

According to certain example embodiments, the DU supervision may be performed in various ways. In one example embodiment, the DU supervision may be performed with a per bearer/DRB bit rate based on the bit rate or other parameters received at the bearer setup, modification, etc. In another example embodiment the DU supervision may be performed based on the DU configurations including, for example, a bit rate limitation per bearer/DRB. According to a further example embodiment, the DU supervision may be performed per NW slice quota(s) configured in DU, received from operations, administration and maintenance (OAM), CU, or artificial intelligence/machine learning (AI/ML) functionality/unit. In another example embodiment, the DU supervision may be performed when the NW slice quota(s) use is continuously or periodically analyzed in the CU, DU, OAM and/or AI/ML functionality/unit, and the feedback may be provided to the CU-C-plane, CU-U plane DU, scheduling, etc.

According to a further example embodiment, the DU supervision may be performed when DU (or CU-U-plane, etc.) provides dynamic resource use information, air interface capacity related, interference, control data, control channel use, user data, dedicated channel, beam management resource information, or channel information for uplink and/or downlink to be used in admission control, quota supervision, etc. According to certain example embodiments, the adjustments may be made in DU additionally or completely, or in other elements and/or functionalities. The adjustments may include moving some UEs to other resources (e.g. to another cell or user plane virtual function), pre-empting the user's bearer, one or more UEs (DRBs, bearers, slices, etc) may be allocated less or more resources such as PRBs (physical resource blocks), UE bit rate may be increased or decreased, etc. In certain example embodiments, such actions can be done on a per network slice quota basis or on an individual UE, (PDU) session, a bearer and/or DRB basis.

In addition to the supervision done at admission control (and/or traffic steering), the system/subsystem may perform per user (e.g. UE-AMBR), (PDU) session, bearer and/or DRB bit rate (or other resource) enforcement, policing and/or shaping in user plane element(s) (e.g., in core network UPF (user plane function)), and CU-User plane element and/or scheduling to meet the network slice specific quota(s). Additionally or instead, the network slice quota supervision may be done by distributing (and updating) some or all of the quotas to the various elements where they are supervised and enforced, including policing and shaping.

Figure 8:
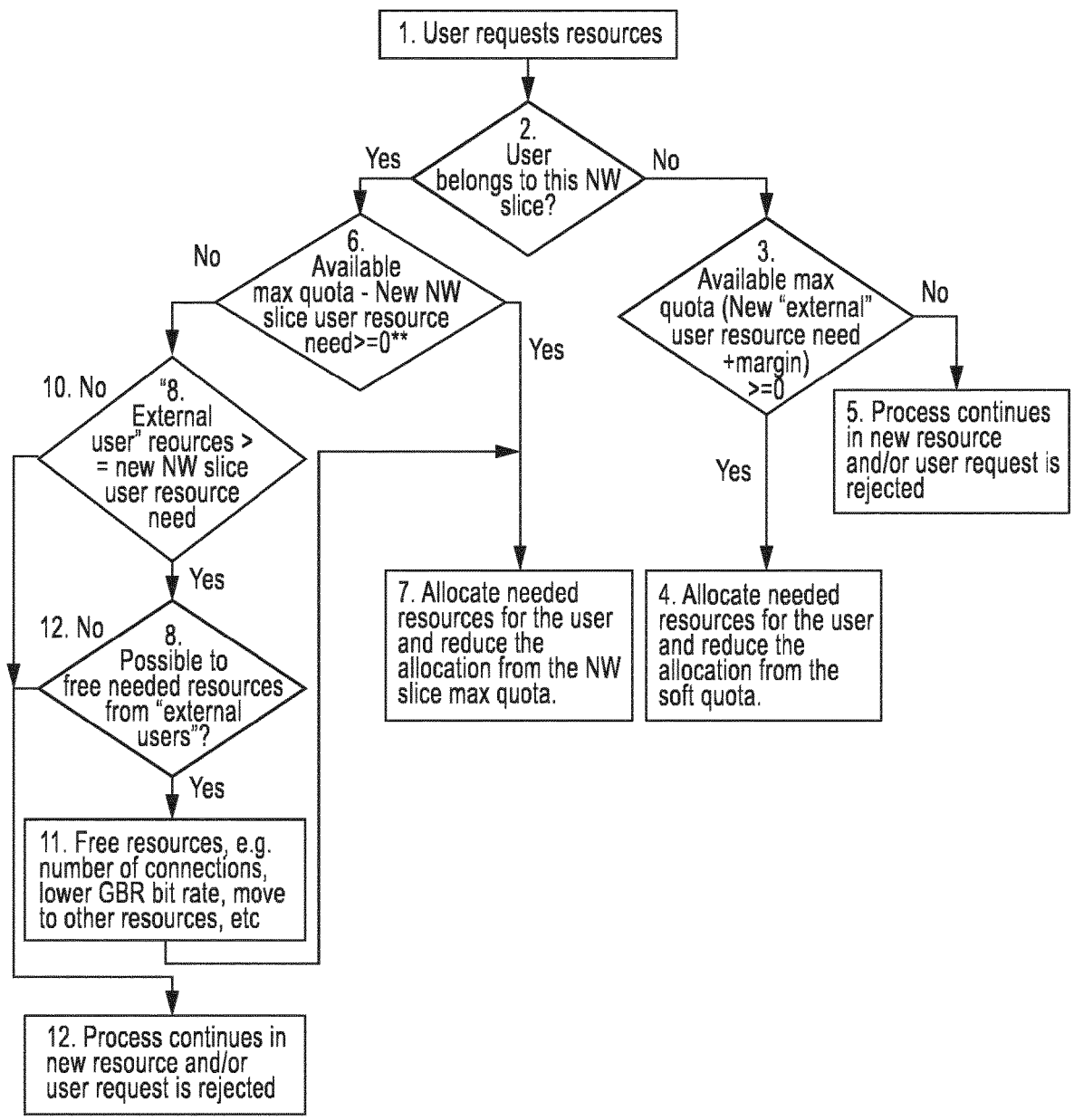
FIG. 8 illustrates a flow diagram of a process for maximum quota resource allocation with a soft limit, according to an example embodiment.

FIG. 8 illustrates a flow diagram of a process for maximum quota resource allocation with a soft limit according to an example embodiment. In an example embodiment, the process illustrated in FIG. 8 may be carried out on a per resource basis. As illustrated in FIG. 8, at 1, a user may request resources from a network element. The new resource request may be, for example, for a DRB, for a resource quota that has been reserved for a specific network slice. At 2, it is determined whether the user belongs to the network slice for which the resource quota has been reserved. If yes, then at 6, it is determined whether the needed amount of quota is available for the user requested resources. If yes, then at 7, the needed resources for the user may be allocated and subtracted from the network slice max quota.

If, however, at 6, it is determined that the needed amount of quota is not available for the user requested resources, then at 8, it is determined if external users are using the soft quota. That is, it is determined if the external user resources are greater than the new network slice user resources needed. If yes, then at 9, the external user resources are verified to determined if they can be freed by moving the external user to another resource (or moving the resource and the user service). If at 8 it is determined that the external user resources are less than the new network slice user resources needed, then at 10, the user is moved to another resource since the network slice specific quota is full.

As further illustrated in FIG. 8, if it is determined at 9 that the external user resources can be freed, then at 11, the needed resources are freed and allocated to the network slice user, and the external user is moved to another resource. For example, the external user may be moved to another cell or RAT. However, if it is determined that the external user resources cannot be freed, then at 12, the user is moved to another resource as the network slice specific quota cannot be used for this set of resources. Then, the same process starts in the new resource if there is a network slice quota reservation. The request may also be rejected, depending on the operator configuration and/or policies. If the request is rejected, the user may not get the requested service and resources, but may be able to continue with current resources, for example, if the current resources are sufficient for the service used.

In FIG. 8, at 2 it may also be determined that the request is for an external user. In other words, it may be determined that the user does not belong to the network slice for which the resource quota has been reserved. In such a case, at 3, it is determined if there is a needed amount of soft quota available for the external user requested resource. If yes, then at 4, the needed resources may be allocated to the external user and subtracted from the soft quota. If no, then at 5, the user is moved to another resource such as another cell, RAT, or user plane VM. In certain example embodiments, the new resource may be any of those described above with regard to when the quota ends. Then, the same process starts in the new resource if there is a network slice quota reservation. The request may also be rejected, depending on the operator configuration and/or policies. If the request is rejected, the user may not get the requested service and resources, but may be able to continue with current resources if the current resources are sufficient for the services used.

Figure 9:
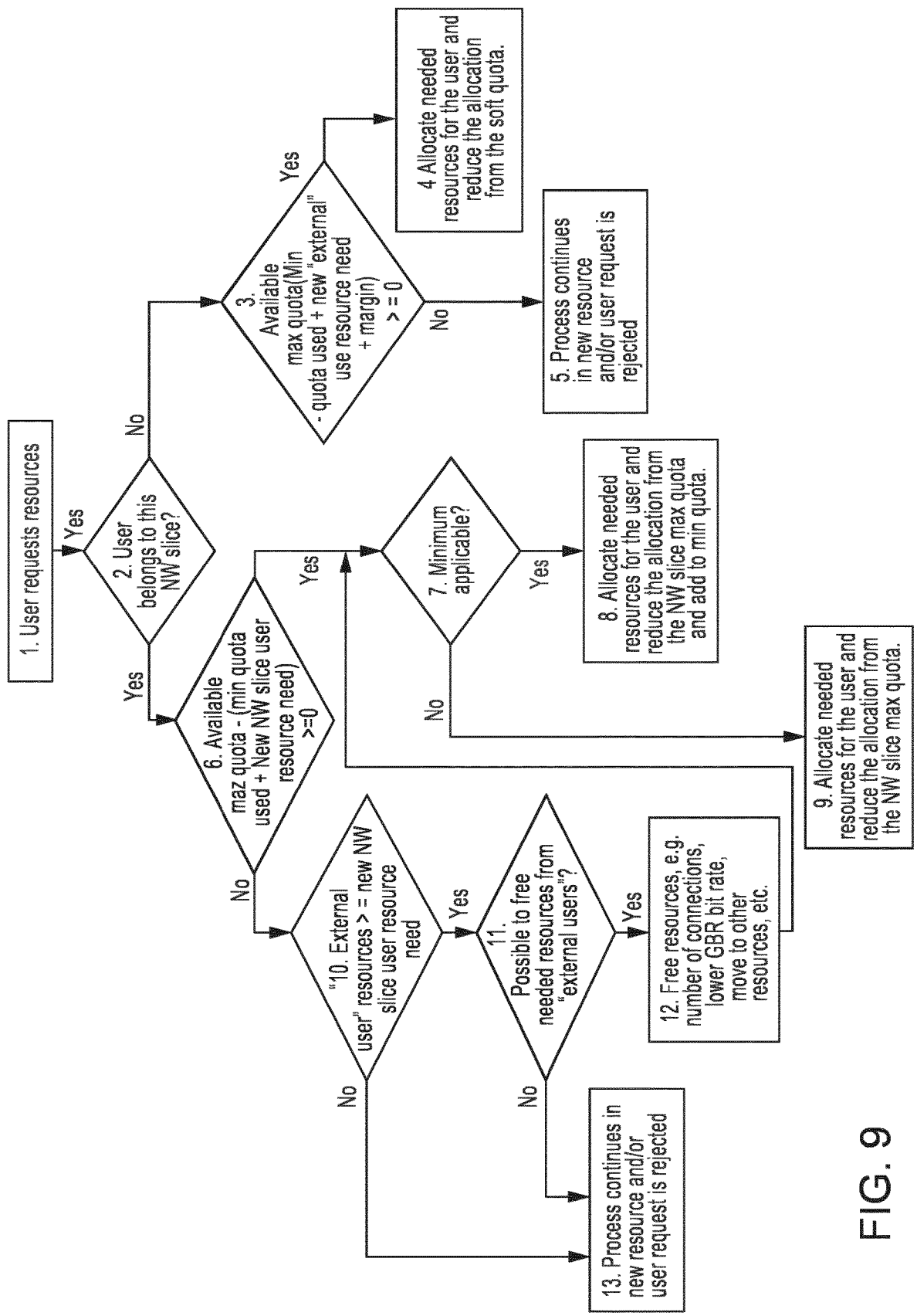
FIG. 9 illustrates a flow diagram of a process for minimum quota resource allocation with a soft limit, according to an example embodiment.

FIG. 9 illustrates a flow diagram for minimum quota resource allocation with a soft limit according to an example embodiment. In an example embodiment, the process illustrated in FIG. 9 may be carried out on a per resource basis. At 1, a user may request resources from a network element. The new resource request may be, for example, for a DRB, for a resource quota that has been reserved for a specific network slice. At 2, it is determined whether the user belongs to the network slice for which the resource quota has been reserved. If yes, at 6, it is determined whether the needed amount of quota is available for the user requested resources. In an example embodiment, this may be determined by subtracting the minimum quota used plus the new network slice user resource needed from the available max quota. If yes, then at 7, it is determined if a minimum quota is applicable. If yes, then at 8, the needed resources for the user may be allocated for the user and subtracted from the network slice max quota and added to the min quota. However, if at 7 it is determined that a minimum quota is not applicable, then at 9, the needed resources for the user may be allocated for the user and subtracted from the network slice quota.

As further illustrated in FIG. 9, if at 6 it is determined that the needed amount of quota is not available for the user requested resources, then at 10, it is determined if external users are using the soft quota. That is, it is determined if the external user resources are greater than the new network slice user resources needed. If yes, then at 11, the external user resources are verified to determined if they can be freed by moving the external user to another resource (or moving the resource and the user service). If at 10 it is determined that the external user resources are less than the new network slice user resources needed, then at 13, the user may be moved to another resource since the network slice specific quota cannot be used for this set of resources. Then, the same process starts in the new resource if there is a network slice quota reservation. The request may also be rejected, depending on the operator configuration and/or policies. If the request is rejected, the user may not get the requested service and resources, but may be able to continue with current resources, for example, if the current resources are sufficient for the service used.

As further illustrated in FIG. 9, if it is determined at 11 that the external user resources can be freed, then at 12, the needed resources are freed and allocated to the network slice user, and the external user is moved to another resource. For example, the external user may be moved to another cell or RAT. Afterwards, the process may proceed according to steps 7-8 as described above. However, if it is determined that the external user resources cannot be freed, then at 13, the user is moved to another resource as the network slice specific quota cannot be used for this set of resources. Then, the same process starts in the new resource if there is a network slice quota reservation. The request may also be rejected, depending on the operator configuration and/or policies. If the request is rejected, the user may not get the requested service and resources, but may be able to continue with current resources, for example, if the current resources are sufficient for the service used. In addition, according to certain example embodiments, the traffic steering described above with regard to when the quota ends may also be applicable for minimum quota resource allocation with a soft limit. Further, for various resources, there may be subgroups and traffic steering actions.

In FIG. 9, at 2, it may also be determined that the request is for an external user. In other words, it may be determined that the user does not belong to the network slice for which the resource quota has been reserved. In such a case, at 3, it is determined if there is a needed amount of soft quota available for the external user requested resource. If yes, then at 4, the needed resources may be allocated to the external user and subtracted from the soft quota. If no, then at 5, the user is moved to another resource such as another cell, RAT, or user plane VM. In certain example embodiments, the new resource may be any of those described above with regard to when the quota ends. Then, the same process starts in the new resource if there is a network slice quota reservation. The request may also be rejected, depending on the operator configuration and/or policies. If the request is rejected, the user may not get the requested service and resources, but may be able to continue with current resources if the current resources are sufficient for the services used.

According to certain example embodiments, UE and air interface related actions for maximum quota resource allocation with a soft limit may be provided. In such cases, the resources reserved and allocated for the UE from the air interface may be to support RRC connection(s), signal radio barriers (SRBs), and data radio barriers (DRBs). Further, the resources to be allocated may include beam(s), multiple-input and multiple-output (MIMO), band width parts (BWPs), physical resource blocks (PRBs), or TTIs in scheduling in one or several cells, frequencies and RATs. In certain example embodiments, the new resource may be any of those described above with regard to when the quota ends.

In an example embodiment, when the resources are allocated for the user, the process may continue normally over the air interface towards the UE. For example, if the RRC connection with SRB(s) is setup, RRC setup may be sent to the UE with the needed information for the UE to setup the RRC connection and SRB(s), and an RRC Setup Complete may be received from the UE as a reply. In another example embodiment, if the DRB(s) and/or SRB(s) are setup, the RRC Reconfiguration to the UE with needed information for the UE to setup the DRB(s) and/or SRB(s), and RRC Reconfiguration Complete may be received as a reply from the UE.

In addition or separately from the above, if the UE is resuming and establishing resources when in RRC Inactive, the RRC Resume may be sent to the UE with the needed information to restore the resumed resources (e.g., SRB(s) and DRB(s)). Further, the UE may reply with an RRC Resume Complete message. If the received RRC Resume requires fallback to RRC connection establishment, then the RRC Setup may be sent to the UE with the needed information for the RRC connection and SRB(s) setup. The UE may then reply with an RRC Setup Complete message. Further, in an example embodiment, downlink control information (DCI) and/or uplink control information (UCI) (channel state information (CSI), rank indicator, hybrid automatic repeat request (HARQ) ack/nack, etc.) procedures over the air interface may be provided to indicate resources to be used for uplink (UL) and downlink (DL).

According to certain example embodiments, if the UE is handed over or redirected to another cell, beam, frequency or RAT, the normal procedures may be used. For example, handover with RRC Reconfiguration (with Inter-RAT handover, sent in target RAT within target RAT RRC procedures) may be used for handover to another beam, cell, frequency or RAT. In another example embodiment, redirection may be performed with RRC release, for example, with redirected carrier information specifying the target NR frequency/cell, or if the UE is redirected to Evolved Universal Terrestrial Radio Access (EUTRA) with redirected carrier information-EUTRA with the target LTE frequency. In a further example embodiment, the UE may be requested to provide the target or own cell measurements to the gNB prior to the handover/redirection.

In other example embodiments, the UE may also be allocated additional radio interface resources and features such as additional carriers for carrier aggregation, dual connectivity, which may require specific procedures as defined in 3GPP 36-38 series specifications. For instance, RRC reconfiguration may typically be used for setting up these resources from the additional cells, carriers and RAT(s). In certain example embodiments, the new resource may be any of those described above with regard to when the quota ends.

According to certain example embodiments, in addition to the air interface related procedures, intra/inter-element, intra/inter-entity, intra/inter-gNB, intra/inter-eNB, and inter-RAT related actions may be needed. In such cases, new resources may be set up and/or existing resources modified by increasing or decreasing one or more resources. These actions may require signaling and processing within and between the elements to setup, modify, remove and/or reallocate. For example, a UE may be moved to another resource within the gNB (RANs) or between gNBs (e.g., to another user control plane element, entity, process, processor, VM, VM function, interface, etc.). In another example embodiment, an action may include inter resource allocations within the gNB such as, for example, from one cloud VM function to another. According to a further example embodiment, an action may include RAN interface related actions over F1, E1, X2, Xn, N2/N3 or similar type interfaces. In addition, in another example embodiment, an action may include scale-in and scale-out for increasing and decreasing cloud virtual resources.

According to certain example embodiments, the resource pool model used may be shared between different network slices, exclusive to one or more network slices, shared between different network slices with flexible quotas with minimum and maximum values, or a mixture of these. In certain example embodiments, these models may require one or more of the following: information as to which resource pool model is used (default may be used); size of the resource quota (e.g., in terms of percentage but may also be a fixed value such as 50 RRC connections or DRBs); and minimum and/or maximum resource quota. In other example embodiments, there may be different quotas for network slices or different sub-quotas within a network slice quota for different QoS values such as 5QIs, GBR versus non-GBR, different applications, and different type of users such as mobile initiated connection only (MICO) versus non-MICO. In addition, according to certain example embodiments, the traffic steering described above with regard to when the quota ends may also be applicable for minimum quota resource allocation with a soft limit. Further, for various resources, there may be subgroups and traffic steering actions.

In certain example embodiments, maximum and minimum resource quota supervision may be provided. According to certain example embodiments, maximum quotas may be applicable for resources that have a numeric restriction such as "x" number of users/DRBs/RRC connections in a cell. According other example embodiments, maximum quotas may be applicable for resources with the possibility to increase and decrease resource use for one user. This may, according to an example embodiment, be done dynamically such as scheduling TTIs/BWPs/cloud virtual network functions (VNFs) with scale-in and scale-out over the air interface. In addition, this may be done with percentage and bit rate, not only numeric value such as "x" users.

According to certain example embodiments, a minimum quota may not be applicable if there are not enough resource requests from users for the resource(s) in question (e.g., for RRC connections, DRBs, TTIs, etc.). However, a minimum quota may be applicable for congestion times. In other example embodiments, the network slice resource quota supervision may be common for network slices with different QoS, services, or functionality. In addition, there may be specific quotas for different QoS parameters such as, for example non-GBR traffic restrictions. In particular, the non-GBR traffic restriction may be done differently from GBR traffic. For instance, GBR/non-GBR quotas may be different. For non-GBR, the delay may be greater than for GBR, or for non-GBR quota may be used but not for GBR or only used after a certain threshold. Also, minimum quota may be with soft limit and possibly with margin, and then traffic steering. In addition, according to certain example embodiments, the traffic steering described above with regard to when the quota ends may also be applicable here, and the new resource may be any of those described above with regard to when the quota ends for different resource types and subgroups.

Figure 10:
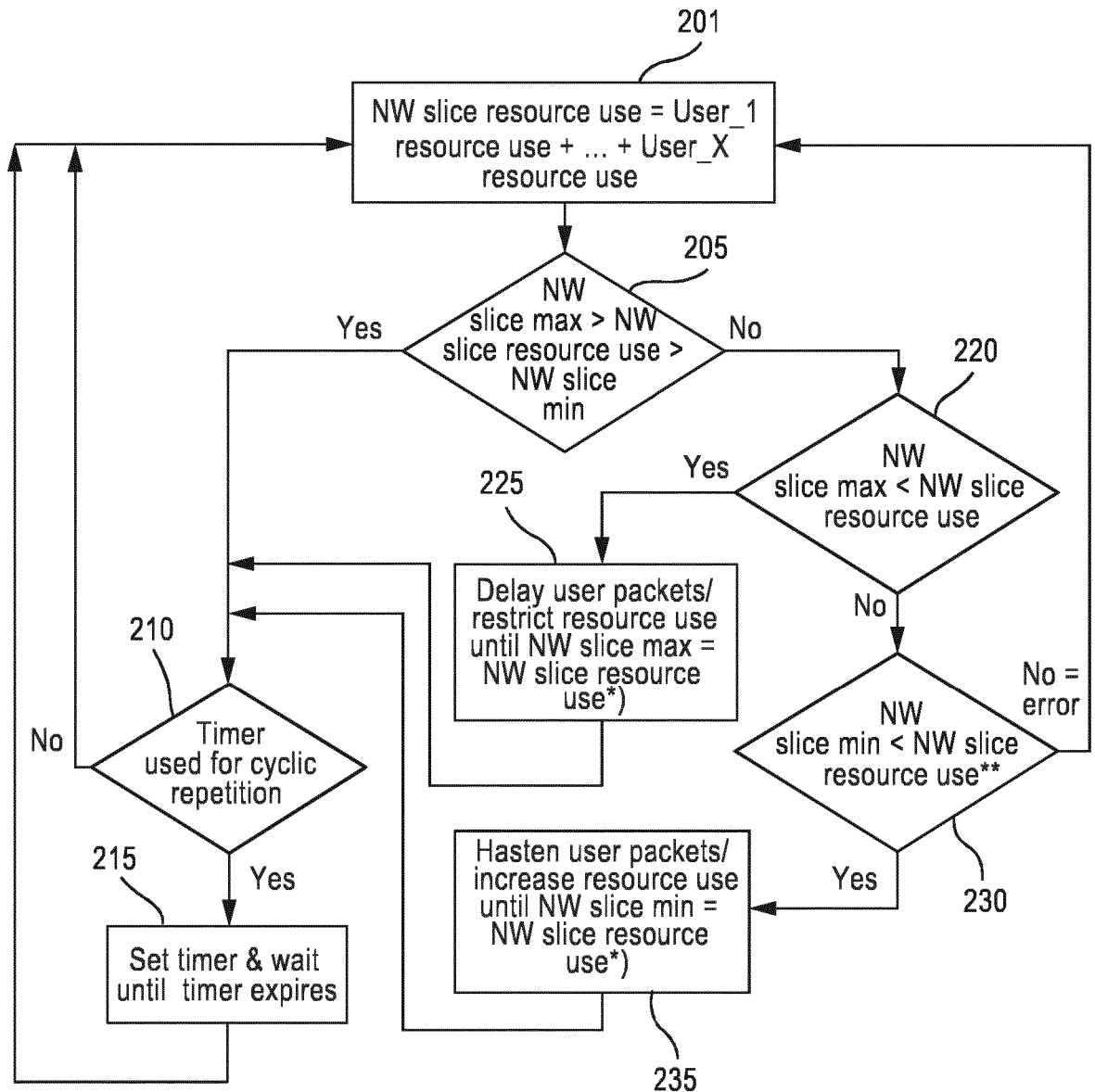
FIG. 10 illustrates a flow diagram of a process for maximum and minimum resource quota supervision, according to an example embodiment.

FIG. 10 illustrates a flow diagram of a process for maximum and minimum resource quota supervision according to an example embodiment. In certain example embodiments, the process illustrated in FIG. 10 may be carried out on a per resource basis. Also, maximum and minimum quota may be with soft limit and possibly with margin, and then traffic steering. In addition, according to certain example embodiments, the traffic steering described above with regard to when the quota ends may also be applicable here, and the new resource may be any of those described above with regard to when the quota ends for different resource types and subgroups.

According to FIG. 10, network slice resource quota supervision may depend on QoS parameters such as. For example, non-GBR traffic restriction may be done differently from GBR traffic (e.g., GBR/non-GBR quotas may be different, for non-GBR the delay may be greater than for GBR, or for non-GBR quota is used but not for GBR or only used after a certain threshold). Further, in the process illustrated in FIG. 10, delaying or hastening may happen at once for network slice specific users or in a stepwise manner splitting users for groups of one or more users, and delaying/hastening each group separately.

As illustrated in FIG. 10, at 201, a network slice resource use may be determined. For instance, this may be determined by adding user_1 resource use with user_2 resource . . . and user_X resource use (i.e., user_1+user_2+user_3 . . . +user_X). At 205, it is determined if the network slice maximum is greater than the network slice resource use, and also if the network slice resource use is greater than the network slice minimum. If yes, at 210, a timer may be used for cyclic repetition. If a timer is used, at 215, the timer may be set. After the time expires, then the process returns to 201.

On the other hand, if at 205 it is determined that the inequality between the network slice maximum, network slice resource use, and network slice minimum is not satisfied, then at 220, it is determined if the network slice maximum is less than the network slice resource use. If yes, then at 225, user packets are delayed or resource use is restricted until the network slice maximum equals the network slice use. Following 225, the processes proceeds to 210 and 215 as previously described. However, if at 220 it is determined that the network slice maximum is not less than the network slice resource use, then at 230, it is determined if the network slice minimum is less than the network slice resource use. If yes, then, the process may proceed to 235 in which user packets may be hastened or the resource use may be increased until the network slice minimum equals the network slice resource use. However, if at 230, it is determined that the network slice minimum is not less than the network slice resource use, an error is noted and the process returns to 201.

According to certain example embodiments, an artificial intelligence (AI) and learning solution may be provided. For instance, an AI or similar solution may be used for analysis, decision-making and action triggering. In certain example embodiments, for the network slice's or network slice group's resource, it may be possible to use analysis, decisions and adjustments including: (1) using one or more detection points and functions; (2) detection function(s) may use the same, different or partially same/different input data to make decisions and execute/trigger actions (e.g., steer UE(s), network slice or network slice group, resource or sub-resource use, and allocation decisions); (3) input and output used may be event based, periodic, dynamic, one time, or a combination of these; (4) the exact method may use network slice or network slice group, static/semi-static system settings such as services supported on a cell/frequency/TAI, or dynamic system or resource characteristics such as cell load; and (5) input and output, such as adjustments to resource quota may be made through micro core interfaces, via traditional database, cloud data repositories, traditional process or entity interfaces.

Figure 11:
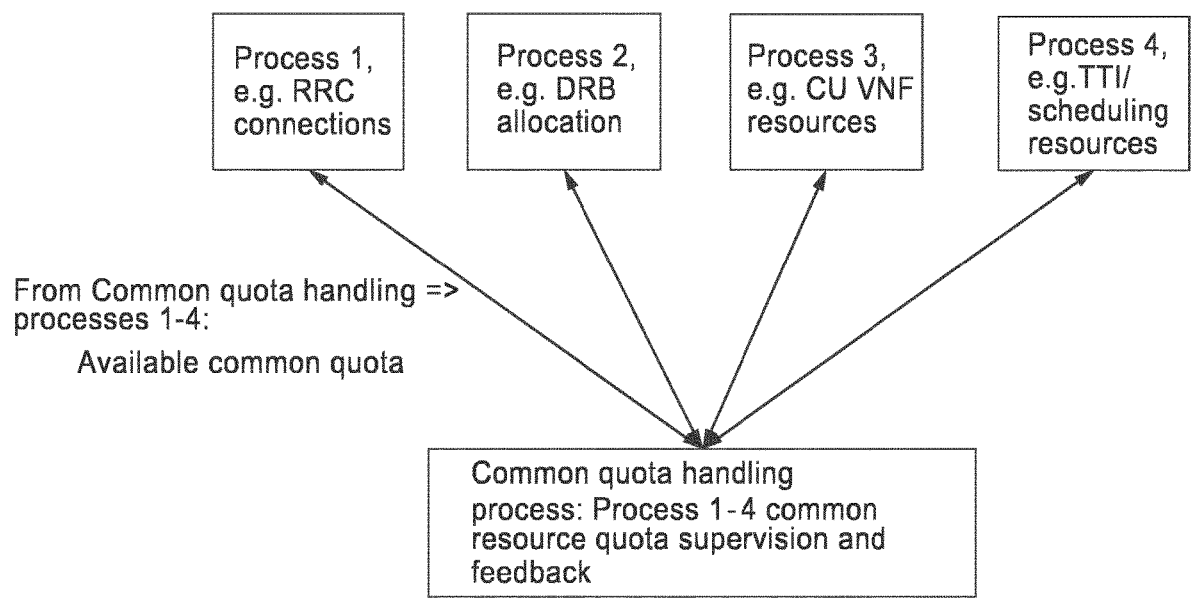
FIG. 11 illustrates certain procedures for artificial intelligence (AI) and learning, according to an example embodiment.

FIG. 11 illustrates certain procedures for AI and learning according to an example embodiment. As illustrated in FIG. 11, the procedures may include Processes 1-4, wherein Process 1 may include RRC connections, Process 2 may include DRB allocation, Process 3 may include CU VNF resources, and Process 4 may include TTI/scheduling resources. Further, in certain example embodiments, various learning possibilities may be provided. For instance, a quota process may learn use patterns for various slice specific needs. In one example embodiment, the quota process may learn specific times when the quotas are used considerably not or not so much, or that the network slices use some process resources more or less than estimated. In addition, a quota process may also steer traffic to available resources, including, for example, if one cell is full, the process has information about other cells so that the UE may be directed to such a cell instead of handing over to a new cell many times.

In certain example embodiments, various resource use supervision and adjustment principles may be provided. For example, there may be various minimum resource quota resource handling possibilities. Such possibilities may include (1) the specific resources may be reserved for the specific network slice or network slice group, and (2) there may be a congestion detection method based on specific criteria (e.g., based on certain resource use principles, number of RRC connected users, number of DRBs in the user, etc.) when "congestion level approaching" or "congestion detected" or both. When detection is done, the resources may not be used for other network slice users. In addition, the congestion detection may be per network slice or per network slice group, or system/subsystem/cell. The freeing of the network slice or network slice group resources may also be freed for general use according to similar principles (i.e., when congestion is reduced).

Another possibility (3) may include congestion detection, which may have different severity steps so that the most important/demanding network slice's or network group slice's resources are restricted first, and less important network slice's or network group slice's resources are reserved last. Alternatively, or in addition, the network slice's or network group slice's resources may be restricted in a stepwise manner as the system is getting congested. For instance, if 10% of the resources are reserved for a specific network slice group, then with system congestion level (or some other resource use criteria): (a) has reached 65%, then 5% of the network slice group resource may be reserved for the network slice group only; (b) has reached 70%, then 7, 5% of the network slice group resources may be reserved for the network slice group only; (c) has reached 75%, then 10% of the network slice group resources may be reserved for the network slice group only; and (d) UEs which are using or wiling to use the network slice specific quota may be handed over to another cell, frequency, UE-UP and/or UE-CP resource, or even RAT, or if this is not possible or desirable, they may not be accepted or would only be accepted for the quota available (e.g., only non-GRB DRBs and possibly with lower bit rate).

A further possibility (4) may be where the network slice or network slice group resources may also be freed for general use according to corresponding principles when the congestion in the system reduces. Yet another possibility (5) may be that minimum and maximum quota may be adjusted based on relative capacity for each resource. For example, if the network slice resource quota is 5% per cell or scheduler serving specific cells and frequencies, it may be directly or semi-directly summed in (higher level) entity serving the cells/scheduler such as 15 (5+5+5) or 10 (5+5) in CU-UP.

In other example embodiments, a loop back method for resource quota supervision and adjustment may be provided. For example, the adjustment may include prioritizing/deprioritizing, policing, shaping, and dropping some or all of the network slice (group) U-plane and/or C-plane traffic. According to an example embodiment, the adjustment may be differentiated for certain 5QIs, users, services, bearer types, or RRC connections.

According to certain example embodiments, the U-plane traffic to be supervised and adjusted may be distributed to many distinct resources. The resources, according to certain example embodiments, may include cloud VM and processors, and all of these may report to the same analysis function or there may be several (or many) adjustment functions reporting to one or more adjustment functions. Thus, according to certain example embodiments, some or all of the described functionality may be distributed or centralized. If the quota is distributed (fully or partially), the quota may be equally shared between the distributed elements, relative to processing capability, traffic type (GBR/non-GBR, per allocation and retention priority aspects, or per 5QI), a combination of various aspects, and based on other criteria.

In addition, in case of (fully or partially) distributed quota, there may be dynamic or periodic reporting and quota adjustment between the distributed parts. According to an example embodiment, the distributed parts may be equal or there may be a hierarchy between them. For example, there may be an adjustment function in the distributed functionality, but there may be a higher level adjustment functionality supervising and adjusting the quota dynamically or periodically between the distributed functionality. In an example embodiment, an example of a distributed functionality may be RAN CU and/or DU, several RAN CUs and/or DUs, which may be in the same physical and/or logical element, in RAN and core networks, different RANs (5G, LTE), or in 5G-LTE dual connectivity architecture, and intra- and/or inter-RAT carrier aggregation.

According to certain example embodiments, physical implementations may vary. For example, in an example embodiment, AI functionality may be used fully or additionally, and additional information may be used (e.g., time of the day, general node/system load, load in various cells/frequencies/RATs, admission control, and/or load control functionality partially or fully combined or interaction with those). In other example embodiments, adjustments may also be done by human interaction or other external means based on analysis data indicating the need for it, such as an alarm or KPI metrics.

Figure 12:
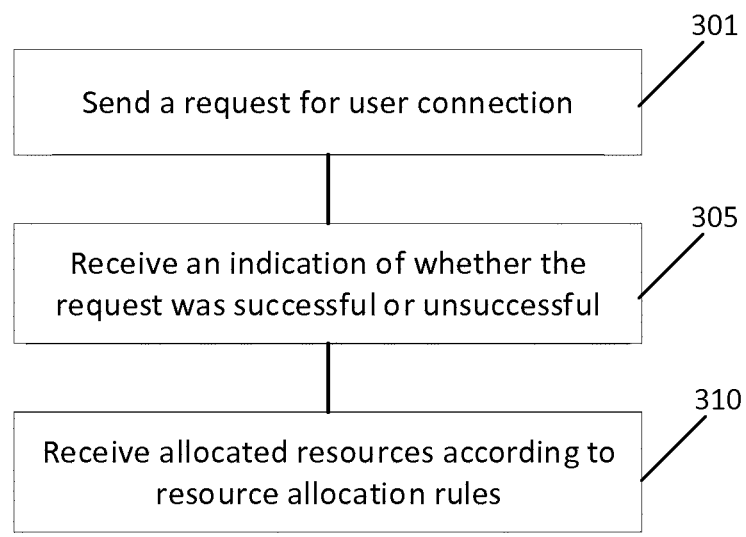
FIG. 12 illustrates an example flow diagram of a method, according to an example embodiment.

FIG. 12 illustrates an example flow diagram of a method according to an example embodiment. In certain example embodiments, the flow diagram may be of a method for obtaining resource quota(s) of a network slice. According to an example embodiment, the flow diagram of FIG. 12 may be performed by a mobile station, mobile device, or UE associated with a communication system, such as a 5G, NG or NR system. In an example embodiment, the method may include, at 301, sending a request for user connection to a network element. In an example embodiment, the request may result in resource quota reservation in a specific network concept. The method may also include, at 305, receiving from the network element, an indication of whether the request was successful. In an example embodiment, the request may include at least one procedure or action indicating network resource availability. Further, the method may include, at 310, receiving allocated resources according to resource allocation rules specific to whether the user is entitled to use the allocated resources, and whether a user connection, a session, a bearer, a signaling connection or a data radio bearer request was successful.

In an example embodiment, the user is entitled to use the allocated resources if the user belongs to the specific network concept. In another example embodiment, whether the user is entitled to use the allocated resources corresponds to whether the user belongs or does not belong to the specific network concept. If the user does not belong to the specific network concept, the user is entitled to use free resources not used by other users that belong to the specific network concept, except a margin associated with the allocated resources. In an example embodiment, the margin may represent a dedicated resource quota used with the user according to a relevant grouping identification or a network slice. In a further example embodiment, the resource quota may be deployed in a combination of different groupings or nesting of different groupings. In addition, a first grouping may be identified by at least one of a network slice, public land mobile network identification, 5QI, device type, subscription type, and a device supporting a specific air interface. Further, a second grouping may be identified by at least one of a different network slice, public land mobile network identification, 5QI, device type, subscription type, subscription profile or other information (e.g., SPID/RFSP (Service Profile Identification/RAT/Frequency Selection Priority), and a device supporting a specific air interface.

According to another example embodiment, the first grouping may be assigned a specific resource quota depending on the corresponding identification of the first grouping, and a different resource quota may be assigned to the second grouping depending on the corresponding identification of the second grouping. According to a further example embodiment, the resource allocation rules may include minimum or maximum quotas defined to supervise quota use and adjust quota use as needed according to quota configurations and allocated resources from the quotas. In an example embodiment, the minimum quota may be defined with a margin, the maximum quota may be defined with a margin, or the minimum quota and the maximum quota may be defined with or with out a margin. In a further example embodiment, the resource quota may include a share of resources, expressed as a percentage number of resources or a specific number of users, connections, bit rates, data radio bearer connections, data radio bearers, physical resource blocks/transmission time intervals, processing resources, hardware resources, software resources, or virtual resources. According to another example embodiment, when the resource quota reservation reaches a certain level or when the resource quota reservation ends, the user may be steered to other resources or use of the resource quota by the user may be pre-empted.

Figure 13:
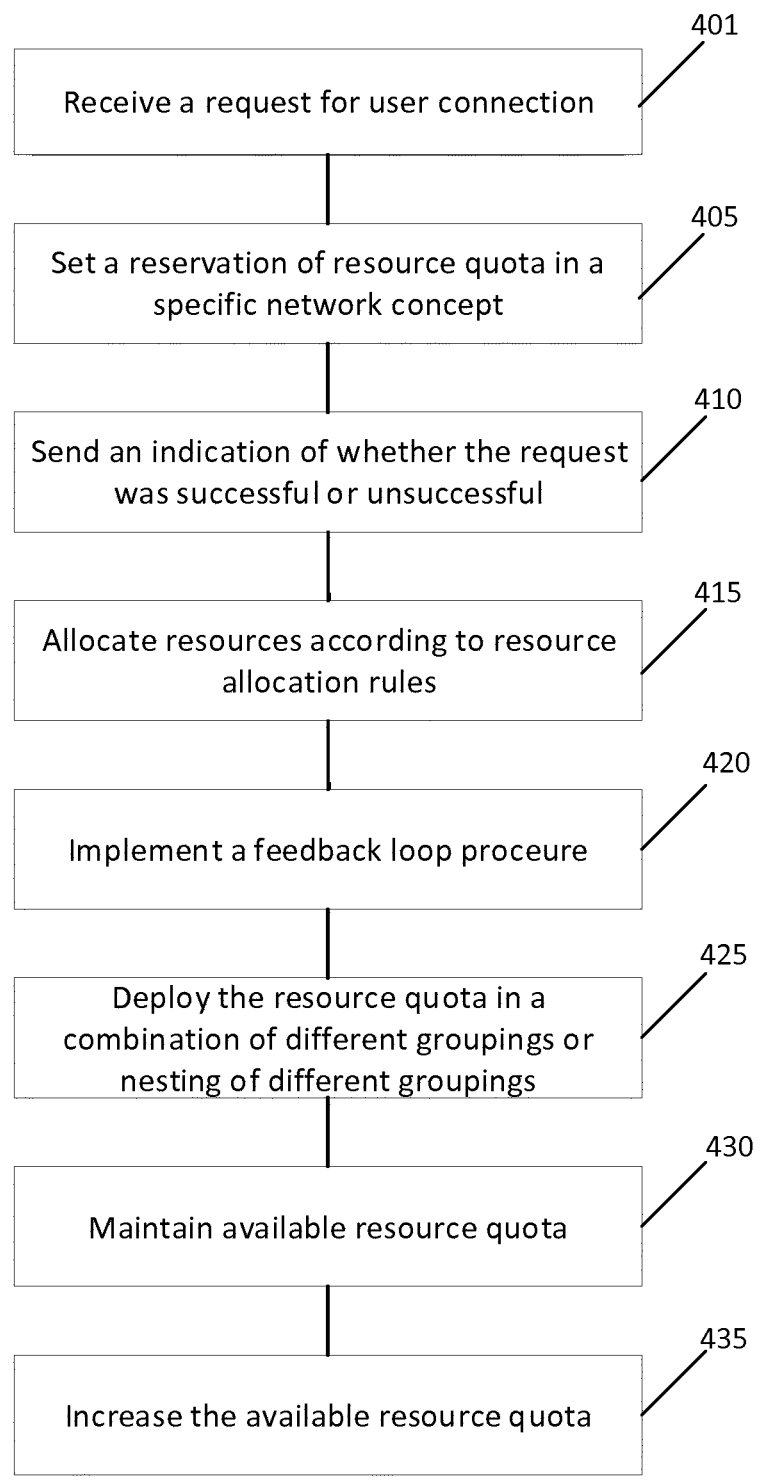
FIG. 13 illustrates an example flow diagram of another method, according to an example embodiment.

FIG. 13 illustrates an example flow diagram of another method according to an example embodiment. In certain example embodiments, the flow diagram may be of a method for providing resource quota(s) of a network slice. According to an example embodiment, the flow diagram of FIG. 13 may be performed by a network entity or network node in a 3GPP system, such as LTE, 5G, NG or NR. For instance, in some example embodiments, the method of FIG. 13 may be performed by a base station, NG-RAN node, eNB, NG-eNB, gNB, or an access node or the like in a 5G, NG or NR system.

In an example embodiment, the method of FIG. 13 may include, at 401, receiving a request for user connection to a network element. The method may also include, at 405, based on the request, setting a reservation of resource quota in a specific network concept. The method may also include, at 410, sending an indication of whether the request was successful or unsuccessful. In an example embodiment, the request may include at least one procedure or action indicating network resource availability. The method may further include, at 415, allocating resources according to resource allocation rules specific to whether a user is entitled to use the allocated resources, and whether a user connection, a session, a bearer, a signaling connection or a data radio bearer request was successful.

Further, the method may include, at 420, implementing a feedback loop procedure to obtain real time or non-real time information concerning how much resources are available/not available or used/unused. In an example embodiment, the feedback may be on a user connection basis, resource or sub-resource basis, or grouping or subgrouping basis, and the feedback loop may include updating available/not available quota based on a received availability or use information. The method may also include, at 425, deploying the resource quota in a combination of different groupings or nesting of different groupings based on a network slice, public land mobile network identification, 5QI, device type, subscription type, or a device supporting a specific air interface. Further, the method may include, at 430, maintaining available resource quota when a new connection request of a user is admitted, and at 435, increasing the available resource quota when an existing user connection removed. According to an example embodiment, the resource allocation rules may include minimum or maximum quotas defined to supervise quota use and adjust quota use as needed according to quota configurations and allocated resources from the quota. According to a further example embodiment, wherein the resource quota is configured separately at one or more network elements among a plurality of network elements.

Figure 14A:
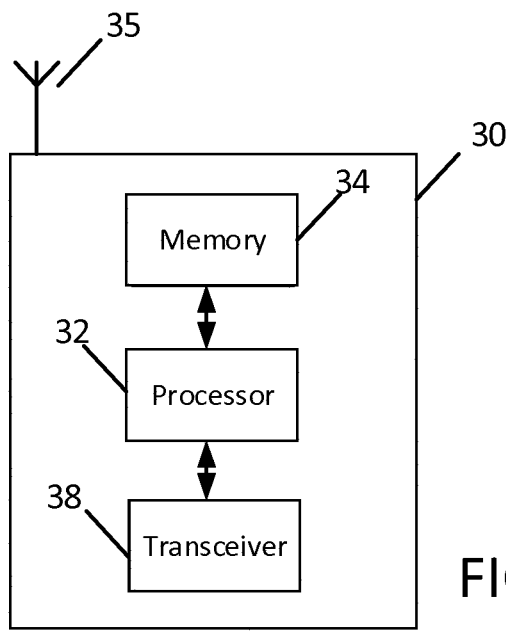
FIG. 14(A) illustrates a block diagram of an apparatus, according to an example embodiment.

FIG. 14(A) illustrates an example of an apparatus 30 according to another example embodiment. In an example embodiment, apparatus 30 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, a connected car, or the like. As one example, apparatus 30 may be implemented in, for instance, a wireless handheld device, a wireless plug-in accessory, or the like.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, UMTS, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 14(A).

As illustrated in the example of FIG. 14(A), apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 14(A), multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, UMTS, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry. According to an example embodiment, apparatus 30 may optionally be configured to communicate with apparatus 10 via a wireless or wired communications link 70 according to any radio access technology, such as NR.

As discussed above, according to some example embodiments, apparatus 30 may be a UE, mobile device, mobile station, ME, IoT device and/or NB-IoT device, for example. According to certain example embodiments, apparatus 30 may be controlled by memory 34 and processor 32 to perform the functions associated with example embodiments described herein. For instance, in some embodiments, apparatus 30 may be configured to perform one or more of the processes depicted in any of the diagrams or signaling flow diagrams described herein, such as the flow diagram illustrated in FIG. 12.

According to certain example embodiments, apparatus 30 may be controlled by memory 34 and processor 32 to send a request for user connection to a network element, the request resulting in resource quota reservation in a specific network concept. The apparatus 30 may also be controlled by memory 34 and processor 32 to receive from the network element, an indication of whether the request was successful or unsuccessful, the request including at least one procedure or action indicating network resource availability. In addition, the apparatus 30 may be controlled by memory 34 and processor 32 to receive allocated resources according to resource allocation rules specific to whether the user is entitled to use the allocated resources, and whether a user connection, a session, a bearer, a signaling connection or a data radio bearer request was successful.

Figure 14B:
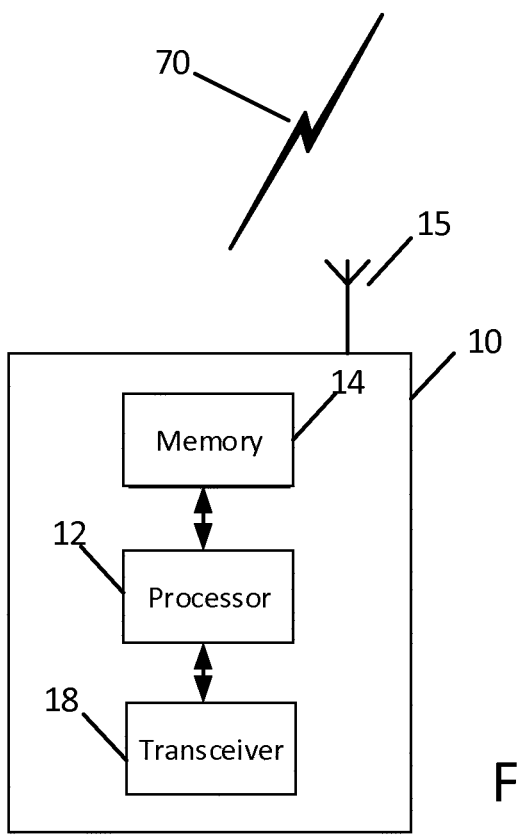
FIG. 14(B) illustrates a block diagram of another apparatus, according to an example embodiment.

FIG. 14(B) illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-eNB or gNB), CU of a gNB, WLAN access point, and/or any other access node associated with a radio access network, such as a 5G, NG or NR system.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 14(B).

As illustrated in the example of FIG. 14(B), apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 15(A), multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. In certain example embodiments, the multiprocessor system may be tightly coupled or loosely coupled (e.g., to form a computer cluster).

Processor may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform the various tasks as described herein.

In an example embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, UMTS, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an example embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According some example embodiments, processor 12 and memory 14 may be included in or may form a part of processing circuitry or control circuitry. In addition, in some example embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain example embodiments, apparatus 10 may be a network node, RAN node or NG-RAN node, such as a gNB or eNB, or the like. According to certain embodiments, apparatus 10 may be controlled by memory 14 and processor 12 to perform the functions associated with any of the embodiments described herein. For example, apparatus 30 may be configured to perform one or more of the processes depicted in any of the diagrams or signaling flow diagrams described herein, such as the flow diagram illustrated in FIG. 13.

For example, in some example embodiments, apparatus 10 may be configured to perform one or more of the processes depicted in any of the flow charts described herein, such as the flow diagram illustrated in FIG. 12. For instance, in some example embodiments, the apparatus 10 may be controlled by memory 14 and processor 12 to receive a request for user connection to a network element. The apparatus 10 may also be controlled by memory 14 and processor 12 to, based on the request, set a reservation of resource quota in a specific network concept. The apparatus 10 may further be controlled by memory 14 and processor 12 to send an indication of whether the request was successful or unsuccessful. In an example embodiment, the request may include at least one procedure or action indicating network resource availability. The apparatus 10 may also be controlled by memory 14 and processor 12 to allocate resources according to resource allocation rules specific to whether a user is entitled to use the allocated resources, and whether a user connection, a session, a bearer, a signaling connection or a data radio bearer request was successful.

The apparatus 10 may further be controlled by memory 14 and processor 12 to implement a feedback loop procedure to obtain real time or non-real time information concerning how much resources are available/not available or used/unused. In an example embodiment, feedback may be on a user connection basis, resource or sub-resource basis, or grouping or subgrouping basis, and the feedback loop may include updating available/not available quota based on a received availability or use information. The apparatus 10 may also be controlled by memory 14 and processor 12 to deploy the resource quota in a combination of different groupings or nesting of different groupings based on a network slice, public land mobile network identification, 5QI, device type, subscription type, or a device supporting a specific air interface. In addition, the apparatus 10 may be controlled by memory 14 and processor 12 to maintain available resource quota when a new connection request of a user is admitted, and increase the available resource quota when an existing user connection removed.

The above embodiments may provide for significant improvements to telecommunication network operations including, for example, resource allocation for network slices. For example, the above example embodiments may provide solutions and/or means for learning network slice use patterns to be used in resource allocation. It may also be possible to provide ways for network operators to keep a certain amount of free resources ready to serve specific users without wasting expensive resources.

Additional example embodiments may be able to enable operators to serve more users without having to keep a substantial amount of resources free to be prepared to serve the specific network slice users (e.g., for third parties with which the operator has made contracts to provide certain amount of services including, for example, small companies buying services from the operator). In addition, it may be possible to refine resource use according to the operator policies in a manner as the operator may provide resources to other users when they are available from the specific network slice users. The operator may also be able to allocate the resources to the specific network slice users when needed.

Furthermore, certain example embodiments may provide operators the ability to group users by their network slices to resource groups. For example, the resource groups may include several network slices with similar QoS requirements, which can share the same resource group which is used internally in the element (or may be exchanged between elements) to facilitate the resource handling in the elements. In certain example embodiments, the same handling may then be used to save resources and feedback loops. The feedback loops may provide real time or non-real time information about how the resources are used and/or on the resource quota use. For example, DU may provide per bearer (DRB and/or SRB), per user/UE, per 5QI, per slice/slice grouping, per PLMN/PLMN ID grouping, information to CU and/or AI/ML functionality on how much resources are being used and CU may adopt its resource allocation, admission control, traffic steering based on the information. DU and/or CU may also provide the information within them to adjust their own resource allocation in scheduling, or in admission control, traffic steering, resource allocation and re-allocation between different resources, e.g. processes or virtual machines etc. CU, e.g. CU control plane, may also provide the quota use information to DU and/or CU user plane. The various elements in the system can provide information on their total available and/or used resource quota per element(s), per subsystem, per resource, e.g. number of users and bearers; total, partial, available and/or used amount of GBR and non-GBR bit rates; layer 1, control plane, user plane, beam handling capacity or other aspects such as measured and/or detected interference, available or used MIMO resources such as rank 1 or 2, etc. This information may be provided one or more times due to change in configuration, event based when a limit is reached which could be absolute or relative change, periodically, etc.

In addition, the AI/learning functionality according to certain example embodiments may provide the ability to establish user patterns such as, for example, timeline patterns when the specific network slice (QoS, mobility, etc.) increases resource use (e.g., congestion times or repeated cycles, and can take that into account in resource allocation).

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to 5G NR and LTE technology, the above embodiments may also apply to any other present or future 3GPP technology, such as LTE-advanced, and/or fourth generation (4G) technology.

Partial Glossary dB Decibels
eNB Enhanced Node B (LTE base station)
GBR Guaranteed Bit Rate
gNB 5G or NR Base Station
LTE Long Term Evolution
MIMO Multiple-Input Multiple-Output
NR New Radio NR-U New Radio Unlicensed
QoS Quality of Service
RF Radio Frequency
SD Slice Differentiator
SLA Service Level Agreement
SST Slice/Service Type
UE User Equipment

I claim:

1. A method, comprising:
    sending by a user, a request for a user connection to a network element, the request resulting in a soft limit resource quota reservation in a specific network concept;
    receiving from the network element, an indication the request was successful, the request comprising at least one procedure or action indicating network resource availability;
    determining whether the user belongs to the specific network concept;
    based on the determination that the user belongs to the specific network concept, receiving allocated resources according to resource allocation rules specific to whether the user is entitled to use the allocated resources, and whether the user connection, a session, a bearer, a signaling connection and a data radio bearer request was successful, wherein resources are allocated differently for users that belong to the network concept compared to users that do not belong to the specific network concept;
    deploying the resource quota in a combination of a first grouping and a second grouping, wherein the first grouping is identified by a network slice, public land mobile network identification, 5QI, device type, subscription type, and a device supporting a specific air interface, and wherein the second grouping is identified by a different network slice, public land mobile network identification, 5QI, device type, subscription type, subscription profile and a device supporting a specific air interface; and
    applying the resource quota differently to different resources.

2. The method according to claim 1, wherein users are entitled to all of the allocated resources if the users to the specific network concept, and wherein the users are not entitled to all of the allocated resources if the users do not belong to the specific network concept.

3. The method according to claim 2, wherein the users are provided with a portion of the allocated resources if the users do not belong to the specific network concept.

4. The method according to claim 1, wherein the resource allocation rules comprises minimum and maximum quotas defined to supervise quota use and adjust quota use as needed according to quota configurations and allocated resources from the quotas.

5. The method according to claim 4,
    wherein the minimum quota is defined with a margin of an allowed increase,
    wherein the maximum quota is defined with a margin of an allowed increase, or wherein the minimum quota and the maximum quota are defined with or without a margin.

6. The method according to claim 1, wherein the resource quota comprises a share of resources, expressed as a percentage number of resources or a specific number of users, connections, bit rates, data radio bearer connections, data radio bearers, physical resource blocks/transmission time intervals, processing resources, hardware resources, software resources, and virtual resources.

7. The method according to claim 1, wherein when the resource quota reservation reaches a certain level or when the resource quota reservation ends, the user is steered to other resources or use of the resource quota by the user is pre-empted.

8. A method, comprising:
    receiving, from a user, a request for user connection to a network element, based on the request, setting a reservation of a soft limit resource quota in a specific network concept;
    sending an indication of whether the request was successful or unsuccessful, the request comprising at least one procedure or action indicating network resource availability;
    determining whether the user belongs to the specific network concept based on the determination that the user belongs to the specific network concept, allocating resources according to resource allocation rules specific to whether a user is entitled to use the allocated resources, and whether a user connection, a session, a bearer, a signaling connection and a data radio bearer request was successful, wherein resources are allocated differently for users that belong to the network concept compared to users that do not belong to the specific network concept;
    deploying the resource quota in a combination of a first grouping and a second grouping, wherein the first grouping is identified by a network slice, public land mobile network identification, 5QI, device type, subscription type, and a device supporting a specific air interface, and wherein the second grouping is identified by a different network slice, public land mobile network identification, 5QI, device type, subscription type, subscription profile and a device supporting a specific air interface; and
    applying the resource quota differently to different resources.

9. The method according to claim 8, further comprising:
    implementing a feedback loop procedure to obtain real time or non-real time information concerning how much resources are available/not available or used/unused,
    wherein feedback may be on a user connection basis, resource or sub-resource basis, or grouping or sub-grouping basis, and
    wherein the feedback loop includes updating available/not available quota based on a received availability or use information.

10. The method according to claim 9, further comprising deploying the resource quota in a combination of different groupings or nesting of different groupings based on a network slice, public land mobile network identification, 5QI, device type, subscription type, and a device supporting a specific air interface.

11. The method according to claim 8, wherein the resource allocation rules comprises minimum or maximum quotas defined to supervise quota use and adjust quota use as needed according to quota configurations and allocated resources from the quota.

12. An apparatus, comprising:
    at least one processor; and
    at least one memory comprising computer program code,
    the at least one memory and the computer program code are configured, with the at least one processor to cause the apparatus at least to:

send, by a user belonging to a specific network concept, a request for a user connection to a network element, the request resulting in a soft limit resource quota reservation in the specific network concept, wherein resources are allocated differently for users that belong to the network concept compared to users that do not belong to the specific network concept;

receive from the network element, an indication of whether the request was successful or unsuccessful, the request comprising at least one procedure or action indicating network resource availability;

receive allocated resources according to resource allocation rules specific to the user being entitled to use the allocated resources based on the user belonging to the specific network concept, and whether the user connection, a session, a bearer, a signaling connection and a data radio bearer request was successful;

wherein the resource quota is deployed in a combination of a first grouping and a second grouping, wherein the first grouping is identified by a network slice, public land mobile network identification, 5QI, device type, subscription type, and a device supporting a specific air interface, and wherein the second grouping is identified by a different network slice, public land mobile network identification, 5QI, device type, subscription type, subscription profile and a device supporting a specific air interface; and wherein the resource quota is applied differently to different resources.

13. The apparatus according to claim 12, wherein the user is entitled to use the allocated resources if the user belongs to the specific network concept.

14. The apparatus according to claim 12, wherein the user is not entitled to all of the allocated resources if the user does not belong to the specific network concept.

15. The apparatus according to claim 12, wherein the resource allocation rules comprises minimum or maximum quotas defined to supervise quota use and adjust quota use as needed according to quota configurations and allocated resources from the quotas.

16. The apparatus according to claim 15,
wherein the minimum quota is defined with a margin,
wherein the maximum quota is defined with a margin, or
wherein the minimum quota and the maximum quota are defined with or without a margin.

17. The apparatus according to claim 12, wherein the resource quota comprises a share of resources, expressed as a percentage number of resources or a specific number of users, connections, bit rates, data radio bearer connections, data radio bearers, physical resource blocks/transmission time intervals, processing resources, hardware resources, software resources, and virtual resources.

18. The apparatus according to claim 12, wherein when the resource quota reservation reaches a certain level or when the resource quota reservation ends, the user is steered to other resources or use of the resource quota by the user is pre-empted.

19. An apparatus, comprising:
at least one processor; and
at least one memory comprising computer program code,
the at least one memory and the computer program code are configured, with the at least one processor to cause the apparatus at least to:
receive, from a user, a request for a user connection to a network element,
based on the request, set a reservation of a soft limit resource quota in a specific network concept;
send an indication of whether the request was successful or unsuccessful, the request comprising at least one procedure or action indicating network resource availability;
determine whether the user belongs to the specific network concept;
based on the determination that the user belongs to the specific network concept, allocate resources according to resource allocation rules specific to whether a user is entitled to use the allocated resources, and whether the user connection, a session, a bearer, a signaling connection or a data radio bearer request was successful, wherein resources are allocated differently for users that belong to the network concept compared to users that do not belong to the specific network concept;
deploy the resource quota in a combination of a first grouping and a second grouping, wherein the first grouping is identified by a network slice, public land mobile network identification, 5QI, device type, subscription type, and a device supporting a specific air interface, and wherein the second grouping is identified by a different network slice, public land mobile network identification, 5QI, device type, subscription type, subscription profile and a device supporting a specific air interface; and
apply the resource quota differently to different resource.

20. The apparatus according to claim 19, wherein the resource allocation rules comprises minimum or maximum quotas defined to supervise quota use and adjust quota use as needed according to quota configurations and allocated resources from the quota.

\* \* \* \* \*